(12) United States Patent
Chande et al.

(10) Patent No.: US 12,185,370 B2
(45) Date of Patent: Dec. 31, 2024

(54) SENSING BANDWIDTH DETERMINATION BY A USER EQUIPMENT (UE) FOR A LISTEN-BEFORE-TRANSMIT (LBT) OPERATION

(71) Applicant: QUALCOMM Incorporated, San Diego, CA (US)

(72) Inventors: Vinay Chande, San Diego, CA (US); Jing Sun, San Diego, CA (US); Arumugam Chendamarai Kannan, San Diego, CA (US); Giovanni Chisci, San Diego, CA (US); Xiaoxia Zhang, San Diego, CA (US); Tao Luo, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 314 days.

(21) Appl. No.: 17/657,328

(22) Filed: Mar. 30, 2022

(65) Prior Publication Data

US 2022/0322430 A1  Oct. 6, 2022

Related U.S. Application Data

(60) Provisional application No. 63/170,354, filed on Apr. 2, 2021, provisional application No. 63/170,374, filed on Apr. 2, 2021.

(51) Int. Cl.
*H04W 74/00* (2009.01)
*H04W 24/10* (2009.01)
(Continued)

(52) U.S. Cl.
CPC ....... *H04W 74/0808* (2013.01); *H04W 24/10* (2013.01); *H04W 72/044* (2013.01)

(58) Field of Classification Search
CPC .......................... H04W 74/0808; H04W 72/44
See application file for complete search history.

(56) References Cited

U.S. PATENT DOCUMENTS 11,252,754 B2 * 2/2022 Babaei ............... H04L 1/1685
11,291,048 B2 * 3/2022 Babaei ............... H04L 1/1887
(Continued)

FOREIGN PATENT DOCUMENTS

WO  WO-2019217007 A1  11/2019
WO  WO-2020167106 A1 *  8/2020 ........ H04W 72/0453

OTHER PUBLICATIONS

3GPP TSG RAN WG1 Meeting 94, R1-1809822 Title: Feature lead summary for NR-U DL signals and Channels (Year: 2018).*
(Continued)

*Primary Examiner* — Faruk Hamza
*Assistant Examiner* — Abusayeed M Haque
(74) *Attorney, Agent, or Firm* — Norton Rose Fulbright US LLP

(57) ABSTRACT

A method of wireless communication includes performing, by a user equipment (UE), a scan in connection with a listen-before-transmit (LBT) operation. A sensing bandwidth associated with the scan is selected by the UE based at least in part on a transmission bandwidth of an uplink transmission, and at least a portion of the sensing bandwidth is included an unlicensed frequency spectrum. The method further includes transmitting, by the UE, the uplink transmission based on a result of the scan.

30 Claims, 8 Drawing Sheets

(51) Int. Cl.
*H04W 72/044* (2023.01)
*H04W 74/0808* (2024.01)

(56) References Cited

U.S. PATENT DOCUMENTS

| | | | | |
|---|---|---|---|---|
| 2017/0311168 | A1* | 10/2017 | Khawer | H04W 16/14 |
| 2020/0221306 | A1* | 7/2020 | Chen | H04W 16/14 |
| 2021/0160919 | A1* | 5/2021 | Wang | H04L 1/1861 |
| 2021/0176028 | A1* | 6/2021 | Zhou | H04W 72/044 |
| 2022/0191927 | A1* | 6/2022 | Hedayat | H04W 74/002 |
| 2023/0276492 | A1* | 8/2023 | Lei | H04L 27/2613 370/329 |
| 2023/0328713 | A1 | 10/2023 | Guo et al. | |

OTHER PUBLICATIONS

"Discussions on Channel Access Mechanism for 52.6-71 GHz", 3GPP Draft, 3GPP TSG RAN WG1 #104-e, R1-2100301, 3rd Generation Partnership Project (3GPP), Mobile Competence Centre, 650, Route Des Lucioles, F-06921 Sophia-Antipolis Cedex, France, vol. RAN WG1, No. e-Meeting, Jan. 25, 2021-Feb. 5, 2021, Jan. 18, 2021 (Jan. 18, 2021), XP051970325, 6 Pages, Retrieved from the Internet: URL: https://ftp.3gpp.org/tsg_ran/WG1_RL1/TSGR1_104-e/Docs/R1-2100301.zip R1-2100301.doc [Retrieved on Jan. 18, 2021].
International Search Report and Written Opinion—PCT/US2022/071477—ISA/EPO—Jul. 5, 2022.
"Email Discussion Summary for Channel Access Mechanism for 52.6GHz-71GHz Band, ver01" R1-2101887, 3GPP TSG RAN WG1 Meeting#104-e, Jan. 25- Feb. 5, 2021, XP051975969, Retrieved from the Internet: URL: https://ftp.3gpp.org/tsg_ran/WG1_RL1/TSGR1_104-e/Docs/R1-2101887.zip [Retrieved on Jan. 30, 2021].

* cited by examiner

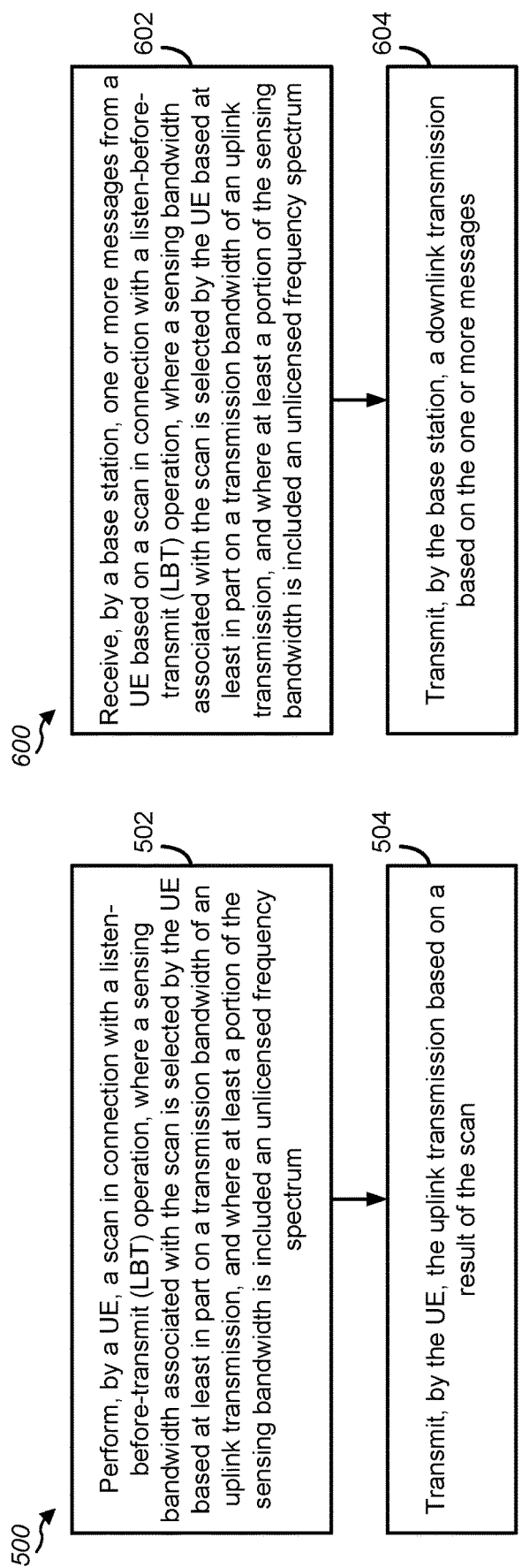

SENSING BANDWIDTH DETERMINATION BY A USER EQUIPMENT (UE) FOR A LISTEN-BEFORE-TRANSMIT (LBT) OPERATION

CROSS-REFERENCE TO RELATED APPLICATIONS

This application claims the benefit of U.S. Provisional Patent Application No. 63/170,374, entitled, "SENSING BANDWIDTH DETERMINATION BY A USER EQUIPMENT (UE) FOR A LISTEN-BEFORE-TRANSMIT (LBT) OPERATION," filed on Apr. 2, 2021, and the benefit of U.S. Provisional Patent Application No. 63/170,354, entitled, "SENSING BANDWIDTH DETERMINATION FOR LISTEN-BEFORE-TRANSMIT (LBT) OPERATION BASED ON A BANDWIDTH PART (BWP)," filed on Apr. 2, 2021, each of which is expressly incorporated by reference herein its entirety.

BACKGROUND

Field

Aspects of the present disclosure relate generally to wireless communication systems, and more particularly, to listen-before-transmit (LBT) operations for wireless communication systems.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In some aspects of the disclosure, a method of wireless communication includes performing, by a user equipment (UE), a scan in connection with a listen-before-transmit (LBT) operation. A sensing bandwidth associated with the scan is selected by the UE based at least in part on a transmission bandwidth of an uplink transmission, and at least a portion of the sensing bandwidth is included an unlicensed frequency spectrum. The method further includes transmitting, by the UE, the uplink transmission based on a result of the scan.

In some other aspects of the disclosure, an apparatus includes a receiver configured to perform, at a UE, a scan in connection with a LBT operation. The UE is configured to select a sensing bandwidth associated with the scan based at least in part on a transmission bandwidth of an uplink transmission, and at least a portion of the sensing bandwidth is included an unlicensed frequency spectrum. The apparatus further includes a transmitter configured to transmit, by the UE, the uplink transmission based on a result of the scan.

In some other aspects of the disclosure, a non-transitory computer-readable medium stores instructions executable by a processor to initiate, perform, or control operations. The operations include performing, by a UE, a scan in connection with a LBT operation. A sensing bandwidth associated with the scan is selected by the UE based at least in part on a transmission bandwidth of an uplink transmission, and at least a portion of the sensing bandwidth is included an unlicensed frequency spectrum. The operations further include transmitting, by the UE, the uplink transmission based on a result of the scan.

In some other aspects of the disclosure, an apparatus includes means for performing, at a UE, a scan in connection with a LBT operation. The UE is configured to select a sensing bandwidth associated with the scan based at least in part on a transmission bandwidth of an uplink transmission, and at least a portion of the sensing bandwidth is included an unlicensed frequency spectrum. The apparatus further includes means for transmitting, by the UE, the uplink transmission based on a result of the scan.

In some other aspects of the disclosure, a method of wireless communication includes receiving, by a UE, one or more first messages indicating one or more BWPs for communication by the UE with a base station. The method further includes performing, by the UE, a scan in connection with an LBT operation. A sensing bandwidth associated with the scan is based at least in part on the one or more BWPs, and at least a portion of the sensing bandwidth is included an unlicensed frequency spectrum. The method further includes transmitting, by the UE, one or more second messages based on a result of the scan.

In some other aspects of the disclosure, an apparatus includes a receiver configured to receive, at a UE, one or more first messages indicating one or more BWPs for communication by the UE with a base station and to perform a scan in connection with a LBT operation. A sensing bandwidth associated with the scan is based at least in part on the one or more BWPs, and at least a portion of the sensing bandwidth is included an unlicensed frequency spectrum. The apparatus further includes a transmitter configured to transmit one or more second messages based on a result of the scan.

In some other aspects of the disclosure, a non-transitory computer-readable medium stores instructions executable by a processor to initiate, perform, or control operations. The operations include receiving, by a UE, one or more first messages indicating one or more BWPs for communication by the UE with a base station. The operations further include performing, by the UE, a scan in connection with a LBT operation. A sensing bandwidth associated with the scan is based at least in part on the one or more BWPs, and at least a portion of the sensing bandwidth is included an unlicensed frequency spectrum. The operations further include transmitting, by the UE, one or more second messages based on a result of the scan.

In some other aspects of the disclosure, an apparatus includes means for receiving, at a UE, one or more first messages indicating one or more BWPs for communication by the UE with a base station and for performing a scan in connection with a LBT operation. A sensing bandwidth associated with the scan is based at least in part on the one or more BWPs, and at least a portion of the sensing bandwidth is included an unlicensed frequency spectrum. The apparatus further includes means for transmitting one or more second messages based on a result of the scan.

The foregoing has outlined rather broadly some examples according to the disclosure in order that the detailed description that follows may be better understood. Additional features and advantages may be described hereinafter. The examples disclosed may be utilized as a basis for modifying or designing other structures for carrying out the same purposes of the present disclosure. Such constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 5 is a flow chart illustrating a method of wireless communication performed by a UE according to some aspects of the disclosure.

FIG. 6 is a flow chart illustrating a method of wireless communication performed by a base station according to some aspects of the disclosure.

DETAILED DESCRIPTION

Figure 1:
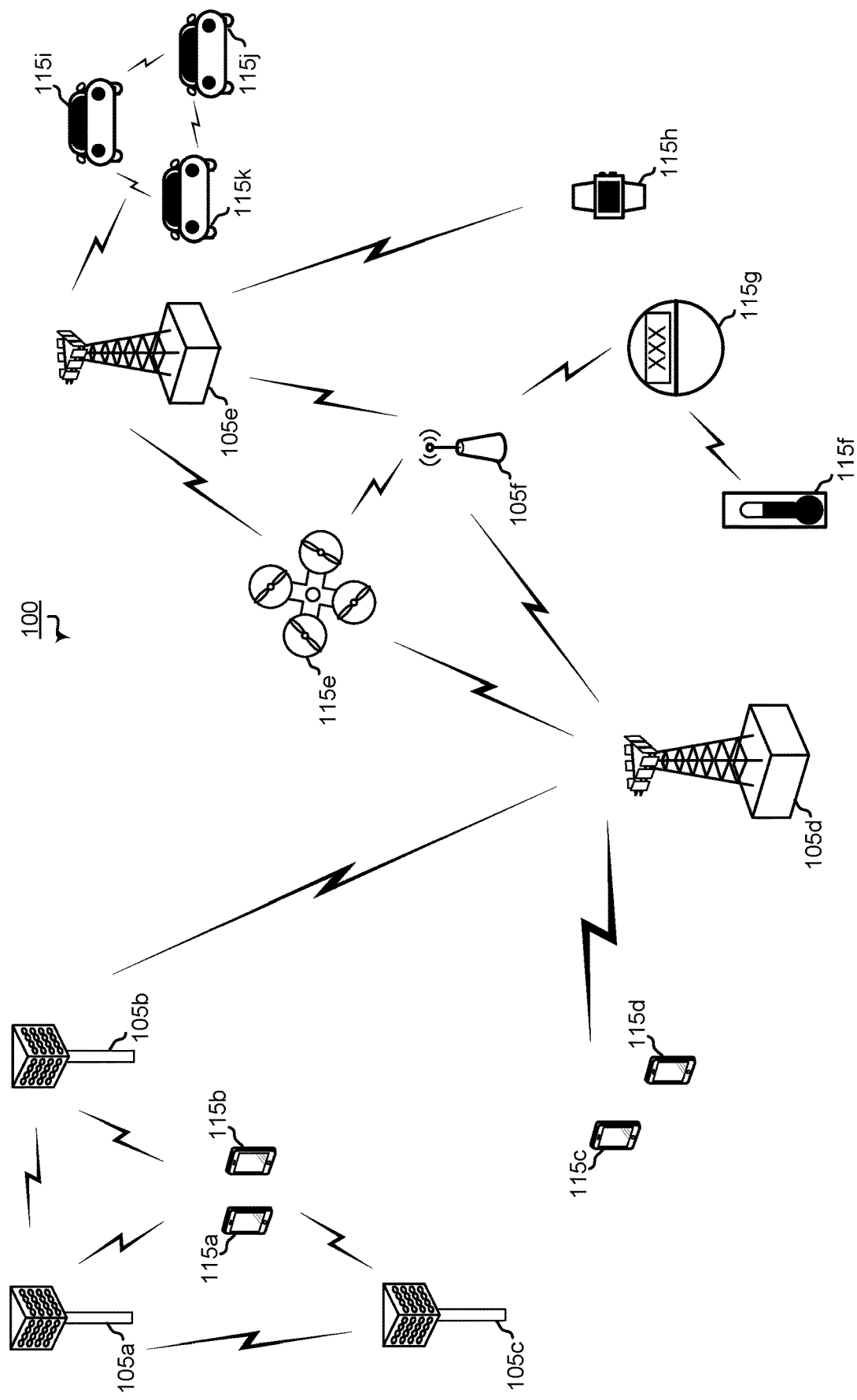
FIG. 1 is a block diagram illustrating an example of a wireless communication system according to some aspects of the disclosure.

The detailed description set forth below, in connection with the drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

Wireless communication systems may use licensed frequency spectrums for communication of data and other signals. A licensed frequency spectrum may be reserved for certain types of communications, such as cellular communications. As the number of cellular devices and cellular communications increase, some wireless communication systems may use unlicensed frequency spectrums for communication. To access an unlicensed frequency spectrum, a device may perform a listen-before-transmit (LBT) operation to acquire the frequency spectrum for a channel occupancy time (COT) (if the LBT operation indicates the frequency spectrum is available). LBT operations can consume resources and power of a device.

Further, a variety of different techniques exist for determining a sensing bandwidth of an LBT operation. For example, various wireless communication protocols may specify that the sensing bandwidth is to correspond to a channel bandwidth, to a transmission bandwidth, or to a particular number of "units" of bandwidth (where a unit of bandwidth indicates a particular amount of bandwidth).

In some aspects of the disclosure, techniques are disclosed for determining a sensing bandwidth of an LBT operation by a user equipment (UE). Determination of the sensing bandwidth for the LBT operation by the UE may improve flexibility of operation associated with a wireless communication system by enabling the UE to "mimic" different techniques for determining sensing bandwidth of an LBT operation. For example, the UE may have an option to select the sensing bandwidth based on a channel bandwidth, a transmission bandwidth, or a particular number of "units" of bandwidth, as illustrative examples.

In some aspects, UE-based sensing bandwidth determination may enable the UE to use certain information accessible to the UE to dynamically modify (e.g., widen or narrow) the sensing bandwidth. As an illustrative example, if the UE detects an ongoing transmission or expects an upcoming transmission (such as a downlink transmission or a sidelink transmission), the UE may widen the sensing bandwidth for the LBT operation to include bandwidth associated with the transmission.

As another example, the UE may use historical information (such as a historical profile of noise or interference) to determine the sensing bandwidth. To illustrate, if the UE detects a relatively small amount of energy during an LBT operation, the UE may increase the sensing bandwidth for a subsequent LBT operation (e.g., to attempt to widen a bandwidth available for an uplink transmission, which may increase reliability or data speed associated with the uplink transmission). As another example, if the UE detects a relatively large amount of energy during an LBT operation, the UE may decrease the sensing bandwidth for a subsequent LBT operation (e.g., to attempt to find a "window" of bandwidth where noise or interference is relatively low).

In addition, techniques are disclosed for enabling sharing of a channel occupancy time (COT) with another device, such as a base station, in connection with a UE-determined sensing bandwidth. For example, in some implementations, the UE may indicate the sensing bandwidth to the base station, and the base station may determine a transmission bandwidth for a downlink transmission based on the sensing bandwidth. Some aspects also enable the UE to encode an indication of the sensing bandwidth using one or more techniques. As a result, in some aspects, UE determination of a sensing bandwidth may be used in connection with COT sharing, which may improve efficiency of resource allocation within a wireless communication system in some circumstances.

Alternatively or in addition, in some other aspects of the disclosure, techniques are disclosed for determining a sensing bandwidth of an LBT operation based on one or more bandwidth parts (BWPs). In some examples, the one or more BWPs include one or more of an uplink BWP (UL-BWP) between a base station and a user equipment (UE) or a downlink BWP (DL-BWP) between the base station and the UE. By performing an LBT operation using a sensing bandwidth that is based on one or more BWPs, a particular "slice" of a frequency spectrum (such as an unlicensed frequency spectrum) may be selected for the sensing bandwidth. As a result, in some cases, the UE may avoid using a sensing bandwidth that is too large (which may increase power consumption) or that is too small (which may result decrease reliability or accuracy of the LBT operation).

Further, by determining the sensing bandwidth based on one or more BWPs, the sensing bandwidth may be determined or changed dynamically during operation without introducing one or more additional messages transmitted between the base station and the UE. For example, a system information block (SIB) that indicates an initial UL-BWP and an initial DL-BWP for initial communications between the base station and the UE may also serve as an indication of the sensing bandwidth (where the sensing bandwidth is based on one or more of the initial UL-BWP or the initial DL-BWP). As another example, a configuration message transmitted by the base station to configure the UE with an active UL-BWP and an active DL-BWP may serve as an indication of the sensing bandwidth (where the sensing bandwidth is based on one or more of the active UL-BWP or the active DL-BWP). In an illustrative example, the SIB indicates an initial sensing bandwidth (via one or more of the initial UL-BWP or the initial DL-BWP) to the UE, and the configuration message indicates an update to the initial sensing bandwidth (by changing the sensing bandwidth from being based on one or more of the initial UL-BWP or the initial DL-BWP to being based on one or more of the active UL-BWP or the active DL-BWP). As a result, the sensing bandwidth may be determined or changed dynamically during operation without increasing a number of messages transmitted between the base station and the UE.

In various implementations, one or more examples described herein may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km^2), ultra-low complexity (e.g., −10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., −0.99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km^2), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-

115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such as UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD communications or low-latency FDD communications, such as in a vehicle-to-vehicle (V2V) mesh network between UEs 115i-115k communicating with macro base station 105e.

Figure 2:
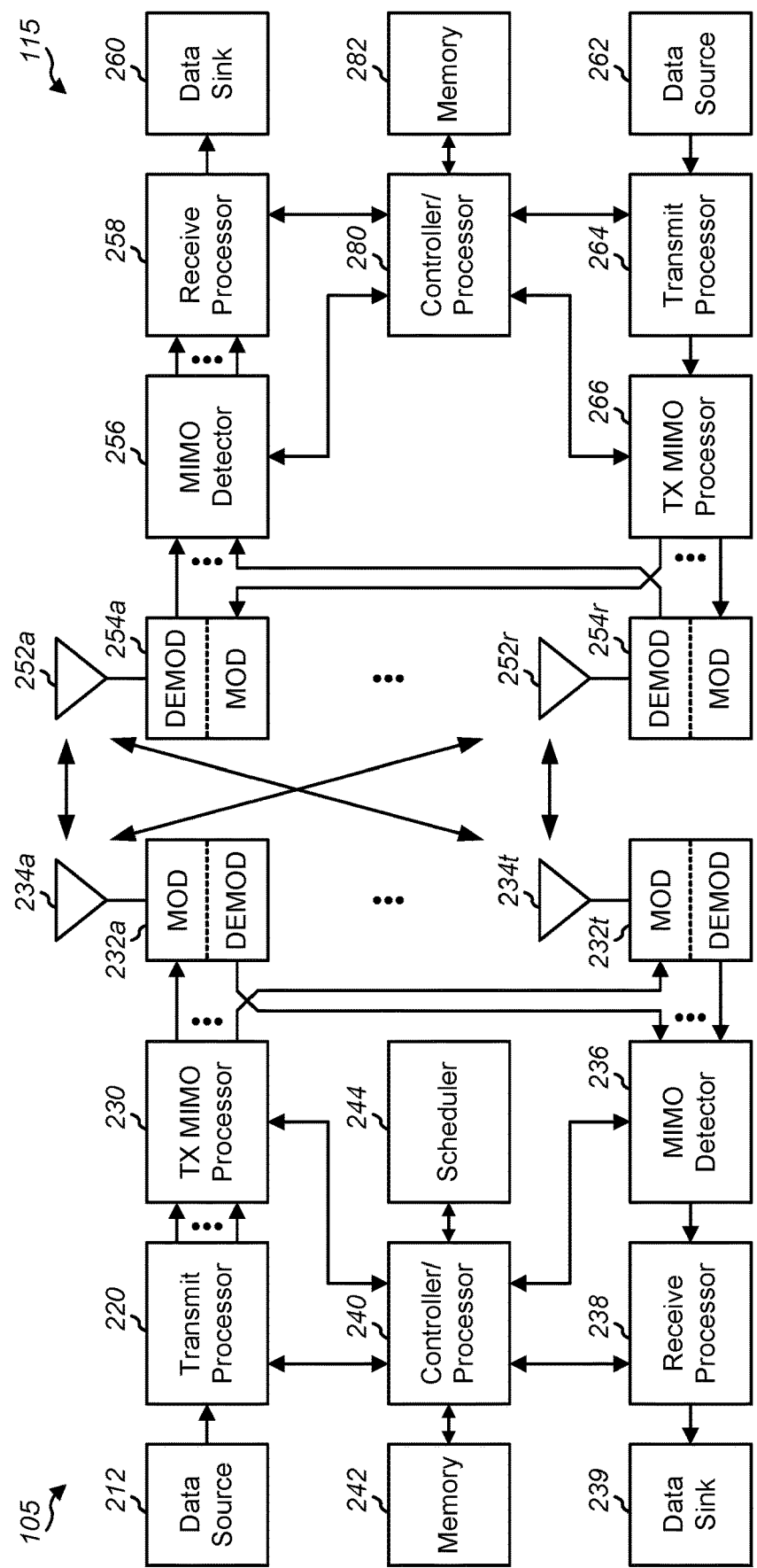
FIG. 2 is a block diagram illustrating examples of a base station and a UE configured according to some aspects of the present disclosure.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105f in FIG. 1, and UE 115 may be UE 115c or 115d operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller/processor 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller/processor 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller/processor 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller/processor 240.

Controllers/processors 240 and 280 may direct the operation at base station 105 and UE 115, respectively. Controller/processor 240 or other processors and modules at base station 105 or controller/processor 280 or other processors and modules at UE 115 may perform or direct the execution of various processes for the techniques described herein, such as to perform or direct the execution illustrated in FIGS. 4 and 5, or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

Figure 3A:
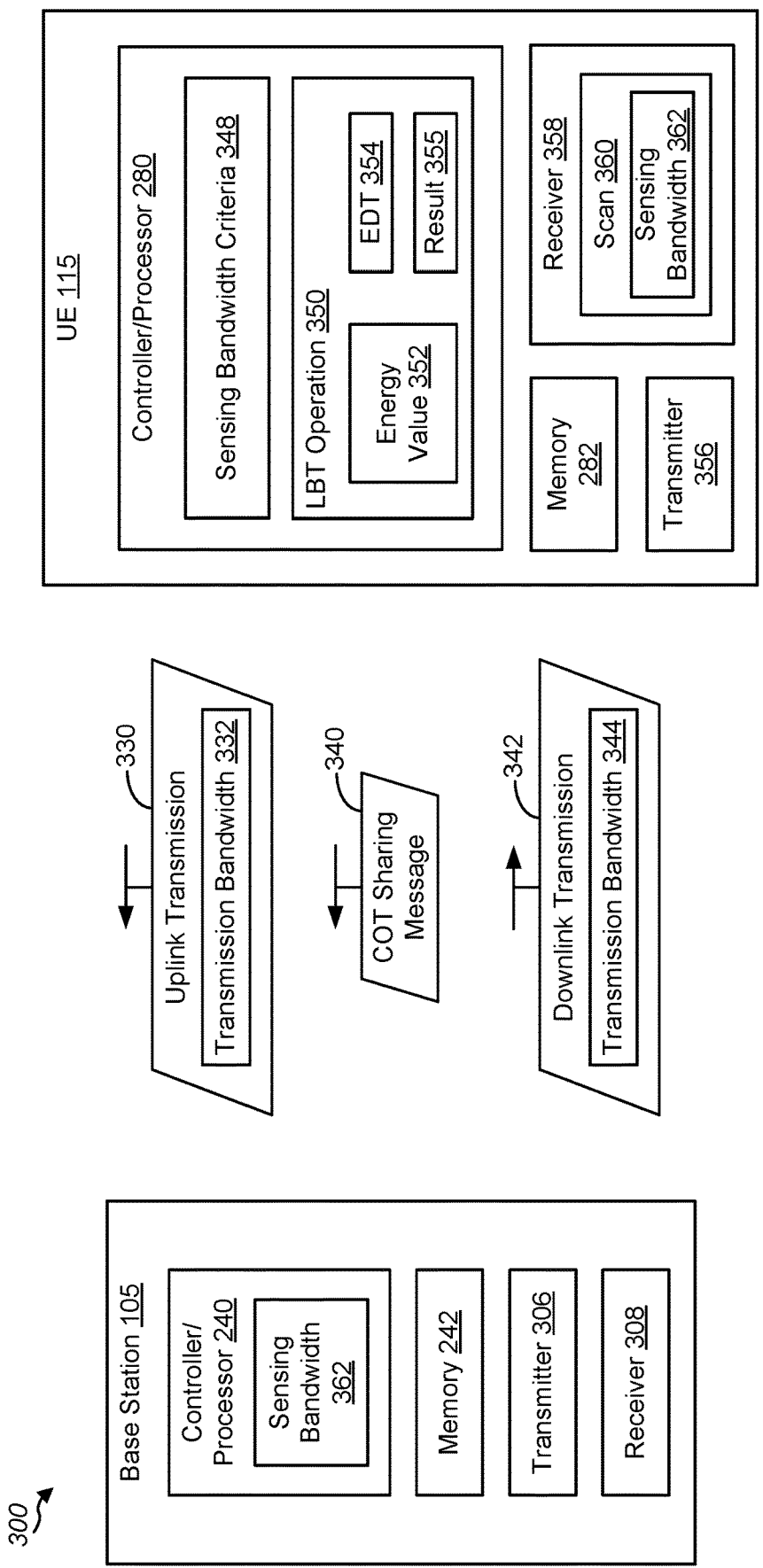
FIG. 3A is a block diagram illustrating an example of a wireless communication system according to some aspects of the disclosure.

FIG. 3A is a block diagram illustrating an example of a wireless communication system 300 according to some aspects of the disclosure. The wireless communication system 300 may include one or more base stations, such as the base station 105. The wireless communication system 300 may further include one or more UEs, such as the UE 115.

The example of FIG. 3A illustrates that the base station 105 may include one or more processors (such as the controller/processor 240) and may include the memory 242. The base station 105 may further include a transmitter 306 and a receiver 308. The controller/processor 240 may be coupled to the memory 242, to the transmitter 306, and to the receiver 308. In some examples, the transmitter 306 and the receiver 308 include one or more components described with reference to FIG. 2, such as one or more of the modulator/demodulators 232a-t, the MIMO detector 236, the receive processor 238, the transmit processor 220, or the TX MIMO processor 230.

The transmitter 306 may transmit reference signals, synchronization signals, control information, and data to one or more other devices, and the receiver 308 may receive reference signals, control information, and data from one or more other devices. For example, the transmitter 306 may transmit signaling, control information, and data to the UE 115, and the receiver 308 may receive signaling, control information, and data from the UE 115. In some implementations, the transmitter 306 and the receiver 308 may be integrated in one or more transceivers of the base station 105.

FIG. 3A also illustrates that the UE 115 may include one or more processors (such as the controller/processor 280), a memory (such as the memory 282), a transmitter 356, and a receiver 358. In some examples, the transmitter 356 and the receiver 358 may include one or more components described with reference to FIG. 2, such as one or more of the modulator/demodulators 254a-r, the MIMO detector 256, the receive processor 258, the transmit processor 264, or the TX MIMO processor 266. In some implementations, the transmitter 356 and the receiver 358 may be integrated in one or more transceivers of the UE 115.

The transmitter 356 may transmit reference signals, synchronization signals, control information, and data to one or more other devices, and the receiver 358 may receive reference signals, control information, and data from one or more other devices. For example, in some implementations, the transmitter 356 may transmit signaling, control information, and data to the base station 105, and the receiver 358 may receive signaling, control information, and data from the base station 105.

In some implementations, one or more of the transmitter 306, the receiver 308, the transmitter 356, or the receiver 358 may include an antenna array. The antenna array may include multiple antenna elements that perform wireless communications with other devices. In some implementations, the antenna array may perform wireless communications using different beams, also referred to as antenna beams. The beams may include transmit beams and receive beams. To illustrate, the antenna array may include multiple independent sets (or subsets) of antenna elements (or multiple individual antenna arrays), and each set of antenna elements of the antenna array may be configured to communicate using a different respective beam that may have a different respective direction than the other beams. For example, a first set of antenna elements of the antenna array may be configured to communicate via a first beam having a first direction, and a second set of antenna elements of the antenna array may be configured to communicate via a second beam having a second direction. In other implementations, the antenna array may be configured to communicate via more than two beams. In some implementations, one or more sets of antenna elements of the antenna array may be configured to concurrently generate multiple beams, for example using multiple RF chains. A set (or subset) of antenna elements may include multiple antenna elements, such as two antenna elements, four antenna elements, ten antenna elements, twenty antenna elements, or any other number of antenna elements greater than two. Although described as an antenna array, in other implementations, the antenna array may include or correspond to multiple antenna panels, and each antenna panel may be configured to communicate using a different respective beam.

In some implementations, wireless communication system 300 operates in accordance with a 5G NR network. For example, the wireless communication system 300 may include multiple 5G-capable UEs 115 and multiple 5G-capable base stations 105, such as UEs and base stations configured to operate in accordance with a 5G NR network protocol such as that defined by the 3GPP.

During operation, the UE 115 may initiate an LBT operation 350 (e.g., to determine whether a frequency spectrum (e.g., an unlicensed frequency spectrum) is available for access by the UE 115). To illustrate, the frequency spectrum may be included in a mmWave frequency spectrum, such as a 52 gigahertz (GHz) to 71 GHz frequency spectrum, as an illustrative example. The 52 to 71 GHz frequency spectrum may be referred to as an FR2x frequency spectrum.

To determine whether the frequency spectrum is available, the UE 115 may perform a scan 360 of a sensing bandwidth 362 (e.g., by detecting signals or interference within the sensing bandwidth 362 and measuring energy of the signals or interference) to determine an energy value 352 associated with the sensing bandwidth 362. The UE 115 may compare the energy value 352 to an energy detection threshold (EDT) 354 and may determine a result 355 of the LBT operation 350 based on the comparison. To illustrate, in some wireless communication protocols, the EDT 354 may be expressed in decibel-milliwatts (dBm) and may be determined based on Equation 1:

$$EDT = -80 \text{ dBm} + 10*\log_{10}\left(\frac{Pmax}{Pout}\right) + 10*\log_{10}(BW). \quad \text{(Equation 1)}$$

In Equation 1, Pmax may indicate a maximum radio frequency (RF) transmission power associated with the UE 115, Pout may indicate an RF transmission power used by the UE 115 (where Pout≤Pmax), and BW may indicate the bandwidth (e.g., in megahertz (MHz) of the particular wireless communication channel.

In some examples, if the energy value 352 fails to satisfy (e.g., is less than, or is less than or equal to) the EDT 354, then the UE 115 may determine that the result 355 indicates that the frequency spectrum is available. In this case, the UE 115 may transmit one or more signals (such as an uplink transmission 330) during a channel occupancy time (COT) associated with the LBT operation 350. The UE 115 may transmit the uplink transmission 330 using a frequency spectrum corresponding to the sensing bandwidth 362. In some other examples, if the energy value 352 satisfies (e.g., is greater than, or is greater than or equal to) the EDT 354, then the UE 115 may determine that the result 355 indicates that the frequency spectrum is unavailable. In this case, the UE 115 may postpone the uplink transmission 330 (e.g., until performing another scan 360 having a result 355 that indicates the frequency spectrum is available).

The sensing bandwidth 362 of the scan 360 may be based on one or more sensing bandwidth criteria 348 specified by a wireless communication protocol, such as a 5G NR wireless communication protocol. In aspects of the disclosure, the wireless communication protocol specifies that the UE 115 is to select the sensing bandwidth 362 based on the one or more sensing bandwidth criteria 348. To illustrate, the one or more sensing bandwidth criteria 348 may specify that the sensing bandwidth 362 is to include at least a transmission bandwidth 332 of the uplink transmission 330. As an illustrative example, if the transmission bandwidth 332 corresponds to a frequency range between 56 and 58 GHz, then the UE 115 may select the sensing bandwidth 362 as a frequency range between 56 and 58 GHz, 53 and 58 GHz, or 56 and 59 GHz, as illustrative examples.

In some implementations, the one or more sensing bandwidth criteria 348 specify that the sensing bandwidth 362 is to include one or more bandwidth units. A bandwidth unit may correspond to a "chunk" of bandwidth, such as a particular number of Hz, MHz, or GHz, as illustrative examples. As an illustrative example, if the sensing bandwidth 362 corresponds to a frequency range between 56 and 58 GHz, and if a bandwidth unit corresponds to a "chunk" of one GHz, then the sensing bandwidth 362 may include two bandwidth units. In some implementations, the one or more sensing bandwidth criteria 348 specify that a contending node (such as the UE 115) is to determine a size of the bandwidth unit (such as one GHz, or another size) for a sensing bandwidth of an LBT operation (such as the sensing bandwidth 362 of the LBT operation 350).

In some aspects, the one or more sensing bandwidth criteria 348 may specify one or more criteria for determining the EDT 354. In one example, the one or more sensing bandwidth criteria 348 may specify that the scan 360 is to be performed separately for each bandwidth unit to determine a plurality of energy values 352 (where each of energy value 352 corresponds to a respective bandwidth unit). The one or more sensing bandwidth criteria 348 may specify that the UE 115 is to sum the plurality of energy values 352 to determine a joint energy value and to compare the joint energy value to the EDT 354 to determine the result 355 of the scan 360. In such examples, the result 355 may correspond to an "all or nothing" result (in which either all bandwidth units pass the LBT operation 350, or all bandwidth units fail the LBT operation 350).

In another example, the one or more sensing bandwidth criteria 348 may specify that the scan 360 is to be performed separately for each bandwidth unit to determine a plurality of energy values 352 and that the UE 115 is to separately compare each energy value 352 to the EDT 354 to determine a plurality of unit results included in the result 355. Each unit result may indicate a corresponding result of a respective bandwidth unit of the sensing bandwidth 362. In such examples, each bandwidth unit included in the sensing bandwidth 362 may separately pass or fail the LBT operation 350.

In some implementations, the one or more sensing bandwidth criteria 348 may specify that the bandwidth units are to be contiguous (and that non-contiguous bandwidth units are ineligible for inclusion in the sensing bandwidth 362). In such examples, each bandwidth unit included in the sensing bandwidth 362 may share at least one frequency boundary with another bandwidth unit included in the sensing bandwidth 362. As an example, the bandwidth units may include a first bandwidth unit associated with a frequency range of 56 to 57 GHz and may further include a second bandwidth unit associated with a frequency range of 57 to 58 GHz. In this case, the first bandwidth unit and the second bandwidth unit may be referred to as contiguous bandwidth units (due to sharing a common frequency boundary of 57 GHz).

In some other implementations, the one or more sensing bandwidth criteria 348 may specify that the bandwidth units may be non-contiguous. In this case, one or more bandwidth units of the sensing bandwidth 362 may be non-contiguous with one or more other bandwidth units of the sensing bandwidth 362. As an example, if the bandwidth units may include a first bandwidth unit associated with a frequency range of 56 to 57 GHz and may further include a second bandwidth unit associated with a frequency range of 59 to 60 GHz. In this case, the first bandwidth unit and the second bandwidth unit may be referred to as non-contiguous bandwidth units (because the first bandwidth unit and the second bandwidth unit do not share a common frequency boundary).

After performing the LBT operation 350, the UE 115 may transmit one or more messages based on the result 355 of the LBT operation 350. For example, depending on the particular implementation, the result 355 may indicate that one or more wireless communication channels are available to the UE 115. Based on the result 355, the UE 115 may transmit the uplink transmission 330 to the base station 105 using the one or more wireless communication channels during the COT associated with the LBT operation 350. Alternatively or in addition, the UE 115 may perform one or more other operations based on the result 355 of the LBT operation 350, such as by "sharing" access to the COT. For example, in some implementations, the UE 115 may share the COT (or a portion of the COT) with a second device to enable the second device to perform a transmission during the COT. To illustrate, the UE 115 may transmit a COT sharing message 340 to the base station 105 to enable the base station 105 to perform a downlink transmission 342 (e.g., to the UE 115 or to another device) during the COT.

In some aspects of the disclosure, the sensing bandwidth 362 is selected by the UE 115, and one or more techniques may be used to enable the base station 105 to determine the sensing bandwidth 362. After determining the sensing bandwidth 362, the base station 105 may determine, based on the sensing bandwidth 362, a second transmission bandwidth for a second transmission, such as a transmission bandwidth 344 of the downlink transmission 342. For example, the base station 105 may determine the transmission bandwidth 344 as a subset of the sensing bandwidth 362. By selecting the transmission bandwidth 344 based on the sensing bandwidth 362, the base station 105 may avoid out-of-band interference that may not be detected by the LBT operation 350.

Figure 3B:
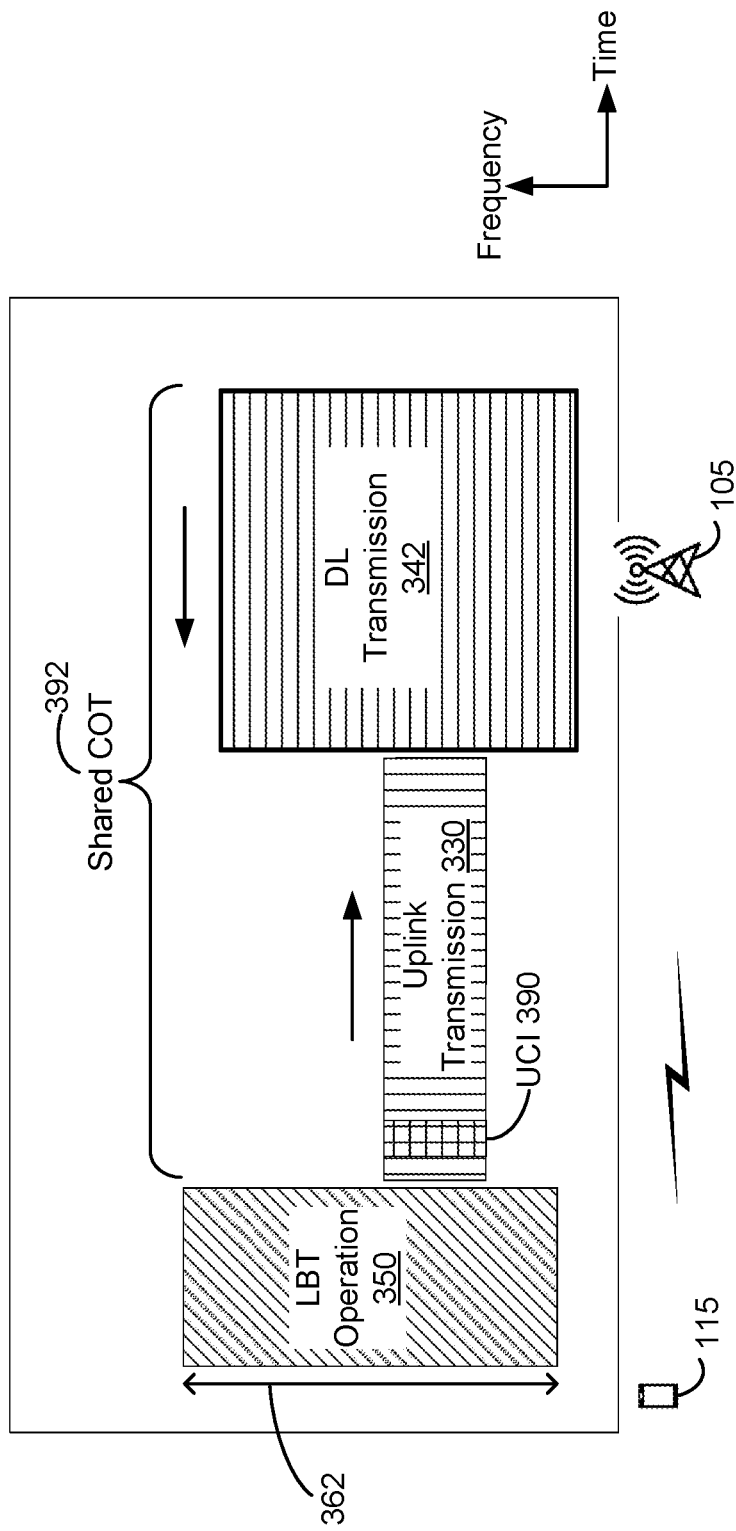
FIG. 3B illustrates an example of a channel occupancy time (COT) sharing transmission scheme according to some aspects of the disclosure.

To further illustrate, FIG. 3B illustrates an example of a COT sharing transmission scheme according to some aspects of the disclosure. In some examples, the LBT operation 350 may include or correspond to an extended clear-channel assessment (eCCA) operation, where the sensing bandwidth 362 may be indicated as $B_S$. The uplink transmission 330 may optionally include control information (such as uplink control information (UCI) 390), and the transmission bandwidth 332 of the uplink transmission 330 may be indicated as $B_{TxUL}$. The transmission bandwidth 344 of the downlink transmission 342 may be indicated as $B_{TxDL}$.

The example of FIG. 3B indicates that a COT 392 acquired by the UE 115 using the LBT operation 350 may be shared among multiple transmissions, such as the uplink transmission 330 and the downlink transmission 342. For example, the UE 115 may perform the uplink transmission 330 during one time interval during the COT 392, and the base station 105 may perform the downlink transmission 342 during another time interval during the COT 392. Further, as illustrated in the example of FIG. 3B, the base station 105 may select the transmission bandwidth 344 of the downlink transmission 342 to be a subset of the sensing bandwidth 362 (e.g., where $B_{TxDL} \subset B_S$, or where $B_{TxDL} \subseteq B_S$).

Referring again to FIG. 3A, in some examples, the sensing bandwidth 362 is "pre-agreed" prior to the shared COT 392. To illustrate, the base station 105 and the UE 115 may operate based on a wireless communication protocol that specifies the sensing bandwidth 362. In some other examples, the UE 115 may transmit, to the base station 105 prior to the shared COT 392, an RRC message indicating the sensing bandwidth 362, an uplink medium access control control-element (MAC-CE) message indicating the sensing bandwidth 362, or a UCI message indicating the sensing bandwidth 362.

In some other examples, the COT sharing message 340 may indicate the sensing bandwidth 362. For example, a particular field of the COT sharing message 340 (such as a header portion) may include a value indicating the sensing bandwidth 362.

In some other examples, the base station 105 may determine the transmission bandwidth 344 without determining the sensing bandwidth 362. For example, the base station 105 may select the transmission bandwidth 344 as a subset of the transmission bandwidth 332 of the uplink transmission 330. To further illustrate, in some examples, the base station 105 may configure the UE 115 with the transmission bandwidth 332 prior to the shared COT 392 (such as via a grant to the UE 115). In such examples, the base station 105 may store scheduling information indicating the transmission bandwidth 332. The base station 105 may access the scheduling information to determine the transmission bandwidth 332 and may select the transmission bandwidth 344 as a subset of the transmission bandwidth 332.

In some examples, the UE 115 may encode an indication of the sensing bandwidth 362 and may transmit the encoded indication to the base station 105 (e.g., within the COT sharing message 340 or within another message). In some examples, the one or more sensing bandwidth criteria 348 specify that the sensing bandwidth 362 is to include contiguous bandwidth units, and the UE 115 encodes the indication of the sensing bandwidth 362 using a starting frequency associated with the sensing bandwidth 362 and a frequency range of the sensing bandwidth 362. As an illustrative example, if the sensing bandwidth 362 corresponds to a frequency range of 58 GHz to 60 GHz, then the UE 115 may indicate the sensing bandwidth 362 using a starting frequency of 58 GHz and a frequency range of two GHz.

In some other examples, the one or more sensing bandwidth criteria 348 specify that the sensing bandwidth 362 is to include contiguous bandwidth units, and the UE 115 encodes the indication of the sensing bandwidth 362 using a size of the bandwidth units, a starting frequency associated with the sensing bandwidth 362, and a cardinality of the bandwidth units. As an illustrative example, if the sensing bandwidth 362 corresponds to a frequency range of 58 GHz to 60 GHz, and if the size of each bandwidth unit is one GHz, then the UE 115 may indicate the sensing bandwidth 362 using a size of bandwidth unit of one GHz, a starting frequency of 58 GHz, and a frequency range of two bandwidth units.

In some other examples, the one or more sensing bandwidth criteria 348 specify that the sensing bandwidth 362 may include non-contiguous bandwidth units. In this case, the UE 115 may indicate the sensing bandwidth 362 using a starting frequency associated with the sensing bandwidth 362, a size of the bandwidth units, and a bitmap of the bandwidth units. As an illustrative example, if the sensing bandwidth 362 corresponds to a frequency range of 58 GHz to 62 GHz, and if the size of each bandwidth unit is one GHz, then the UE 115 may indicate the sensing bandwidth 362 using a size of bandwidth unit of one GHz, a starting frequency of 58 GHz, and a bitmap having four bits corresponding to the four bandwidth units. Each bit of the bitmap may have a value indicating whether the corresponding bandwidth unit is associated with a successful result of the LBT operation 350 (e.g., via a logic one value of the bit) or whether the corresponding bandwidth unit is associated with an unsuccessful result of the LBT operation 350 (e.g., via a logic zero value of the bit).

In some other examples, the one or more sensing bandwidth criteria 348 specify that the sensing bandwidth 362 may include non-contiguous bandwidth units, and the UE 115 may indicate the sensing bandwidth 362 using a respective starting frequency associated with each bandwidth unit of the bandwidth units and further using a size of the bandwidth units. As an illustrative example, if the sensing bandwidth 362 corresponds to a frequency range of 58 GHz to 60 GHz, and if the size of each bandwidth unit is one GHz, then the UE 115 may indicate the sensing bandwidth 362 using starting frequencies of 58 GHz and 59 GHz and further using a size of each bandwidth unit of one GHz.

Although certain examples have been described with reference to the UE 115 for convenience, one or more operations described herein may be performed by another device, such as the base station 105. To illustrate, in some wireless communication protocols, the base station 105 may perform the LBT operation 350. In some examples, the base station 105 may perform a downlink transmission based on the LBT operation 350, or may share the COT 392 associated with the LBT operation 350 with one or more other devices, such as the UE 115.

In some aspects of the disclosure, the one or more sensing bandwidth criteria 348 may be determined, indicated, or changed dynamically during operation of the wireless communication system 300. For example, the base station 105 may configure (or reconfigure) the UE 115 with the one or more sensing bandwidth criteria 348. In some examples, the base station 105 provides an indication of the sensing bandwidth criteria 348 in one or more messages transmitted to the UE 115. Alternatively or in addition, at least some aspects of the one or more sensing bandwidth criteria 348 may remain static during operation of the wireless communication system 300.

One or more aspects described herein may improve flexibility of operation associated with the wireless communication system 300. For example, determination of the sensing bandwidth 362 by the UE 115 may improve flexibility of operation by enabling the UE 115 to "mimic" different techniques for determining the sensing bandwidth 362. For example, the UE 115 may have an option to select the sensing bandwidth 362 based on a channel bandwidth, a transmission bandwidth, or a particular number of "units" of bandwidth, as illustrative examples.

In some aspects, UE-based sensing bandwidth determination may enable the UE 115 to use certain information accessible to the UE 115 to dynamically modify (e.g., widen or narrow) the sensing bandwidth 362. As an illustrative example, if the UE 115 detects an ongoing transmission or expects an upcoming transmission (such as a downlink transmission or a sidelink transmission), the UE 115 may widen the sensing bandwidth 362 for the LBT operation 350 to include bandwidth associated with the transmission.

As another example, the UE 115 may use historical information (such as a historical profile of noise or interference) to determine the sensing bandwidth 362. To illustrate, if the UE 115 detects a relatively small amount of energy during the LBT operation 350, the UE 115 may increase the sensing bandwidth 362 for a subsequent LBT operation (e.g., to attempt to widen a bandwidth available for an uplink transmission, which may increase reliability or data speed associated with the uplink transmission). As another example, if the UE 115 detects a relatively large amount of energy during the LBT operation 350, the UE 115 may decrease the sensing bandwidth 362 for a subsequent LBT operation (e.g., to attempt to find a "window" of bandwidth where noise or interference is relatively low).

In addition, one or more techniques described herein may enable sharing of a COT with another device, such as the base station 105, in connection with a UE-determined sensing bandwidth. For example, in some implementations, the UE 115 may indicate the sensing bandwidth 362 to the base station 105, and the base station 105 may determine the transmission bandwidth 344 for the downlink transmission 342 based on the sensing bandwidth 362. Some aspects also enable the UE 115 to encode an indication of the sensing bandwidth 362 using one or more techniques. As a result, in some aspects, UE determination of the sensing bandwidth 362 may be used in connection with COT sharing, which may improve efficiency of resource allocation within the wireless communication system 300 in some circumstances.

Figure 4:
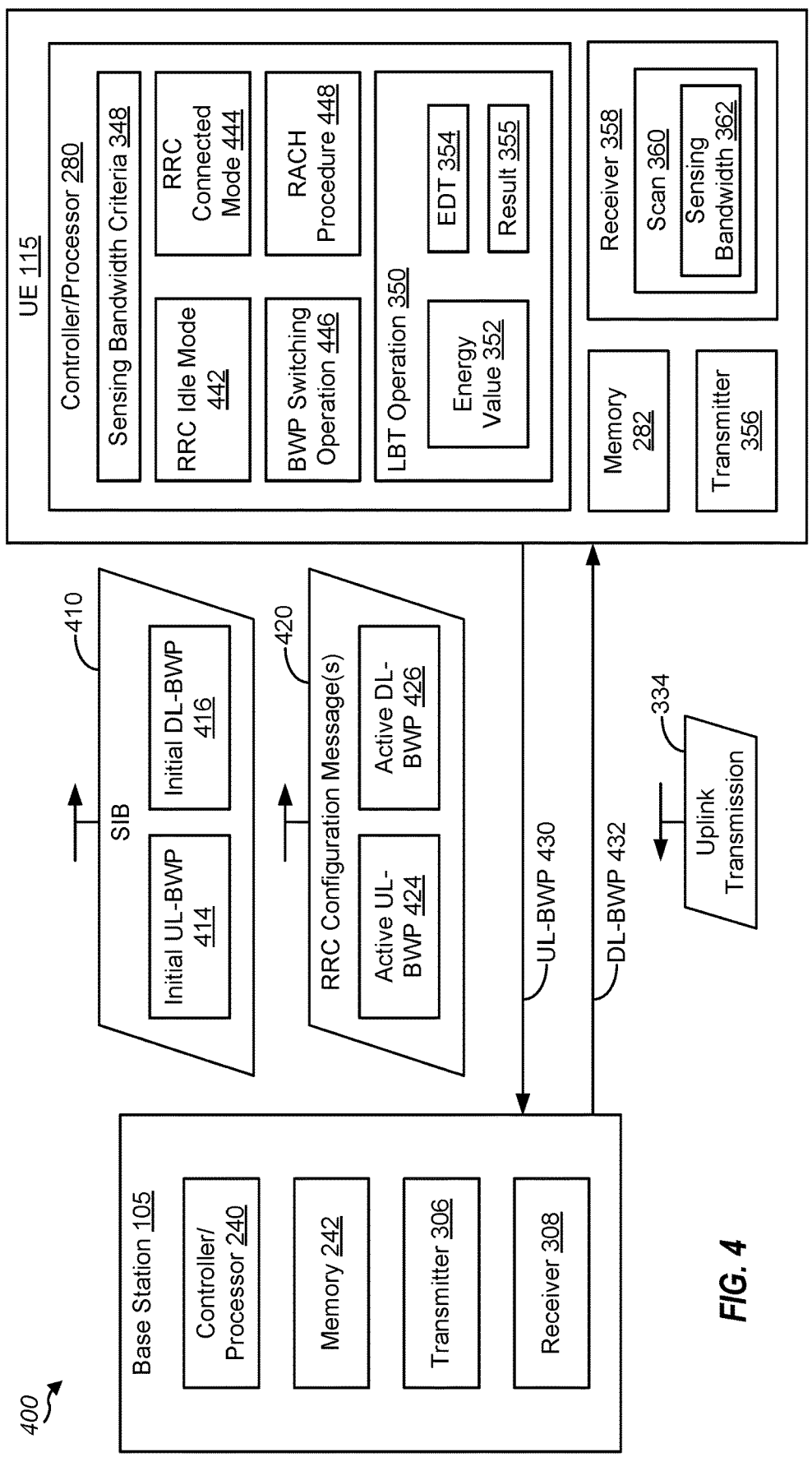
FIG. 4 is a block diagram illustrating another example of a wireless communication system according to some aspects of the disclosure.

FIG. 4 is a block diagram illustrating an example of a wireless communication system 400 according to some aspects of the disclosure. The wireless communication system 400 may include one or more base stations, such as the base station 105. The wireless communication system 400 may further include one or more UEs, such as the UE 115. Depending on the implementation, one or more features described with reference to FIG. 4 may be implemented alternatively or in addition to one or more features described with reference to FIG. 5.

In some implementations, wireless communication system 400 may operate in accordance with a 5G NR network. For example, the wireless communication system 400 may include multiple 5G-capable UEs 115 and multiple 5G-capable base stations 105, such as UEs and base stations configured to operate in accordance with a 5G NR network protocol such as that defined by the 3GPP.

In the example of FIG. 4, the one or more sensing bandwidth criteria 348 may specify that the sensing bandwidth 362 is based at least in part on bandwidth parts (BWPs) associated with one or more wireless communication channels used for communication between the base station 105 and the UE 115. In some examples, the one or more wireless communication channels may include an uplink bandwidth part (UL-BWP) 430 and a downlink bandwidth part (DL-BWP) 432. In some implementations, bandwidths of the UL-BWP 430 and the DL-BWP 432 are included in an unlicensed frequency spectrum, such as a mmWave frequency spectrum (e.g., FR2x, or another frequency spectrum).

To illustrate, the one or more sensing bandwidth criteria 348 may specify that the sensing bandwidth 362 is based on one of a first bandwidth of the UL-BWP 430, a second bandwidth of the DL-BWP 432, a union of the first bandwidth and the second bandwidth (e.g., the union excludes a third bandwidth that is between the first bandwidth and the second bandwidth), or a span of the first bandwidth and the second bandwidth (e.g., where the span includes the third bandwidth). In some examples, the one or more sensing bandwidth criteria 348 specify that the sensing bandwidth 362 corresponds to (e.g., is equal to) one of the first bandwidth, the second bandwidth, the union of the first bandwidth and the second bandwidth, or the span of the first bandwidth and the second bandwidth. In some other examples, the one or more sensing bandwidth criteria 348 specify that the sensing bandwidth 362 includes and is a superset of one of the first bandwidth, the second bandwidth, the union of the first bandwidth and the second bandwidth, or the span of the first bandwidth and the second bandwidth.

To further illustrate, Table 1 depicts certain examples in accordance with some aspects of the disclosure.

TABLE 1

| Example: | Sensing Bandwidth 362: | Comment: |
| --- | --- | --- |
| A | Bandwidth of UL-BWP | Includes uplink transmission bandwidth. |
| B | Bandwidth of DL-BWP | May be relatively simple to implement if receive filter is already tuned based on the DL-BWP; may be used based on the bandwidth of the DL-BWP including (e.g., being a superset of) the bandwidth of the UL-BWP. |
| C | Union or Span of UL-BWP and DL-BWP | May apply to overlapping or non-overlapping UL-BWP and DL-BWP bandwidths; if overlap between UL-BWP and DL-BWP bandwidths |

TABLE 1-continued

| Example: | Sensing Bandwidth 362: | Comment: |
|---|---|---|
| | | have a common center frequency, then union or span may correspond to the greater of the UL-BWP and DL-BWP bandwidths. |

Example A of Table 1 indicates that by using the bandwidth of the UL-BWP 430 as the sensing bandwidth 362, the sensing bandwidth 362 includes an uplink transmission bandwidth that may be used for an uplink transmission, which may increase reliability or accuracy of the LBT operation 350. To illustrate, if the sensing bandwidth 362 corresponds to the bandwidth of the UL-BWP 430, and if the result 355 indicates that the UL-BWP 430 is available, then the UE 115 may transmit the uplink transmission 334 using the UL-BWP 430. In this case, because the sensing bandwidth 362 and the uplink transmission 334 include or correspond to the same bandwidth (the bandwidth of the UL-BWP 430), then the scan 360 may reflect channel conditions experienced by the uplink transmission 334 with a relatively high degree of accuracy or reliability.

Example B of Table 1 indicates that by using the bandwidth of the DL-BWP 432 as the sensing bandwidth 362, certain operations may be simplified at the UE 115. For example, if a receive filter of receiver 358 is already tuned to receive signals based on the bandwidth of the DL-BWP 432, then use of the bandwidth of the DL-BWP 432 may enable the UE 115 to avoid returning the receive filter of the UE 115. For example, in some scenarios, an implementation according to Example B may enable the UE 115 to avoid retuning the receive filter to receive based on the UL-BWP 430, which may be performed in an implementation according to Example A. In some cases, an implementation according to Example B may produce a less accurate or reliable result 355 (such as if the transmission bandwidth of the uplink transmission 334 is different than the bandwidth of the DL-BWP 432) as compared to Example A.

Example C of Table 1 indicates that the union or span of bandwidths of the UL-BWP 430 and the DL-BWP 432 may be used where the bandwidth of the UL-BWP 430 is contiguous or non-contiguous with the bandwidth of the DL-BWP 432. In some cases, determining the union or span may include determining that the UL-BWP 430 and the DL-BWP 432 share a common center frequency. In this case, greater bandwidth of the bandwidths of the UL-BWP 430 and the DL-BWP 432 may include the other of the bandwidths of the UL-BWP 430 and the DL-BWP 432, and the UE 115 may determine the sensing bandwidth 362 as the greater of the bandwidths.

The UL-BWP 430 and the DL-BWP 432 may be indicated by one or more first messages transmitted by the base station 105. In some examples, the UL-BWP 430 corresponds to an initial UL-BWP 414, and the DL-BWP 432 corresponds to an initial DL-BWP 416. To illustrate, the UE 115 may operate according to a radio resource control (RRC) idle mode 442 (e.g., while searching for a base station 105) and may receive a first message, such as a system information block 410 (e.g., a SIB of type one (SIB1)) from the base station 105, while operating according to the RRC idle mode 442. The SIB 410 may specify the initial UL-BWP 414 and the initial DL-BWP 416 for initial communication between the base station 105 and the UE 115. The UE 115 may perform the scan 360 while operating based on the RRC idle mode 442.

In some other examples, the UL-BWP 430 corresponds to an active UL-BWP 424, and the DL-BWP 432 corresponds to an active DL-BWP 426. To illustrate, after establishing communication with the base station 105 (e.g., in response to detecting the SIB 410), the UE 115 may operate according to an RRC connected mode 444 with the base station 105. The base station 105 may transmit a first message to the UE 115, such as one or more RRC configuration messages 420 configuring the UE 115 with the active UL-BWP 424 and the active DL-BWP 426 for communication between the base station 105 and the UE 115. The UE 115 may perform the scan 360 while operating based on the RRC connected mode 444.

Further, in some implementations, one or both of a UL-BWP or a DL-BWP that are used to determine the sensing bandwidth 362 may change dynamically during operation of the UE 115, such as in response to a BWP switching operation 446 performed by the UE 115. To illustrate, the UE 115 may perform BWP switching operation 446 to modify one or more of the UL-BWP 430 the DL-BWP 432, and the sensing bandwidth 362 may be based on BWPs that are associated with the UE 115 at a time of channel access. The BWP switching operation 446 may modify the UL-BWP 430 from a first UL-BWP to a second UL-BWP, may modify the DL-BWP 432 from a first DL-BWP to a second DL-BWP, or a combination thereof. In some examples, if the scan 360 occurs prior to the BWP switching operation 446, then the sensing bandwidth 362 may be based on one or more of the first UL-BWP or the first DL-BWP. In some examples, if the scan 360 occurs after the BWP switching operation 446, then the sensing bandwidth 362 may be based on one or more of the second UL-BWP or the second DL-BWP. The UE 115 may perform the BWP switching operation 446 based on detecting one or more events, such as based on an a BWP switching instruction included in an RRC configuration message of the one or more RRC configuration messages 420 or based on expiration of a timer associated with activation of a BWP, as illustrative examples.

In some other examples, the UE 115 may perform the scan 360 during a random access channel (RACH) procedure 448. To illustrate, after receiving the SIB 410, the UE 115 may perform the RACH procedure 448 including the scan 360 (e.g., to determine whether a RACH is available for communication with the base station 105) based on the initial UL-BWP 414 and the initial DL-BWP 416 indicated by the SIB 410. After acquiring the RACH based on the scan 360, the UE 115 may receive the one or more RRC configuration messages 420 from the base station 105 configuring the UE 115 with the active UL-BWP 424 and the active DL-BWP 426. After receiving the one or more RRC configuration messages 420, the UE 115 may adjust the sensing bandwidth 362 from being based on the initial UL-BWP 414 and the initial DL-BWP 416 indicated by the SIB 410 to being based on the active UL-BWP 424 and the active DL-BWP 426 indicated by the one or more RRC configuration messages 420. After adjusting the sensing bandwidth 362, the UE 115 may perform a subsequent scan 360 based on the active UL-BWP 424 and the active DL-BWP 426.

In some implementations, the UE 115 may perform the adjustment of the sensing bandwidth 362 (from being based on the initial UL-BWP 414 and the initial DL-BWP 416 indicated by the SIB 410 to being based on the active UL-BWP 424 and the active DL-BWP 426) after transmitting a particular message associated with the RACH procedure 448, such as where the base station 105 transmits the one or more RRC configuration messages 420 based on receiving the particular message. In some implementations, the RACH procedure 448 may correspond to a four-step contention-based RACH procedure, and the particular message corresponds to a message of type three (Msg3) associated with the four-step contention-based RACH procedure. The UE 115 may transmit the Msg3 via a physical uplink shared channel (PUSCH). In some other implementations, the RACH procedure 448 corresponds to a two-step RACH procedure, and the particular message corresponds to a message of type A (MsgA) associated with the two-step RACH procedure.

In some cases, a transmission by the UE 115 (such as the uplink transmission 334) may be exempt from one or more operations associated with the RACH procedure 448, such as contention-based operations that may be specified by the RACH procedure 448 in some implementations. For example, in some wireless communication protocols, certain control signals may be exempt from contention-based operations. To illustrate, control signals having a duration of less than a threshold duration may fall within a "short control signaling duty cycle budget" and may be exempt from contention-based operations. As another example, in some wireless communication protocols, a COT shared from another device (such as the base station 105) may be exempt from contention based operations. In such examples, the UE 115 may transmit signaling exempt from contention-based operations without first performing contention-based operations for the signaling (and without performing the scan 360).

In some examples, the UE 115 is configured with one or more supplemental uplink (SUL) carriers. In some implementations, the one or more sensing bandwidth criteria 348 may specify that the scan 360 is to be performed separately for each of the SUL carriers. In this case, the UE 115 may perform a scan 360 separately for each SUL carrier, where a separate sensing bandwidth 362 for each SUL carrier corresponds to an active UL-BWP that is associated with the SUL carrier. In this case, some SUL carriers may be available for communication by the UE 115, and other SUL carriers may be unavailable for communication by the UE 115.

In some other examples, the one or more sensing bandwidth criteria 348 may specify that the scan 360 is to be performed jointly for a primary uplink channel and the one or more SUL carriers (e.g., according to an "all or nothing" basis). In such examples, the UE 115 may perform the scan 360 jointly for the primary carrier and the one or more SUL carriers, and the sensing bandwidth 362 may include active UL-BWPs associated with the primary carrier and the one or more SUL carriers. In such examples, the UE 115 may determine either that the primary uplink channel and the one or more SUL carriers are jointly available, or that that the primary uplink channel and the one or more SUL carriers are jointly unavailable. It is noted that one or more aspects described above (such as with reference to Table 1) may be applicable to the primary uplink channel and the one or more SUL carriers.

Alternatively or in addition, in some examples, the UE 115 may be configured with multiple carrier frequencies associated with a multi-carrier implementation. In some examples, the one or more sensing bandwidth criteria 348 may specify that the scan 360 is to be performed separately for each carrier frequency of the multiple carrier frequencies, such as a first carrier frequency and a second carrier frequency. In this case, the UE 115 may perform a scan 360 (e.g., where the sensing bandwidth 362 corresponds to an active UL-BWP of the first carrier frequency) to determine a result 355 indicating whether the first carrier frequency is available (e.g., based on a comparison of an energy value associated with the first carrier frequency with an EDT). The UE 115 may separately perform another scan 360 (e.g., where the sensing bandwidth 362 corresponds to an active UL-BWP of the second carrier frequency) to determine another result 355 indicating whether the second carrier frequency is available (e.g., based on a comparison of an energy value associated with the second carrier frequency with an EDT).

In some other examples, the one or more sensing bandwidth criteria 348 may specify that the scan 360 is to be performed jointly for the multiple carrier frequencies (e.g., according to an "all or nothing" basis). In such examples, the UE 115 may perform a joint scan 360 (e.g., where the sensing bandwidth 362 includes active UL-BWPs of the multiple carrier frequencies) to determine the result 355 (e.g., based on a comparison of a combined energy value associated with the multiple carrier frequencies with an EDT). In such examples, the UE 115 may determine either that the multiple carrier frequencies are jointly available, or that that the multiple carrier frequencies are jointly unavailable. It is noted that one or more aspects described above (such as with reference to Table 1) may be applicable to the multiple frequency carrier implementation.

After performing the LBT operation 350, the UE 115 may transmit one or more second messages based on the result 355 of the LBT operation 350. For example, depending on the particular implementation, the result 355 may indicate that one or more wireless communication channels are available to the UE 115. Based on the result 355, the UE 115 may transmit the uplink transmission 334 to the base station 105 using the one or more wireless communication channels, which may occur during a COT associated with the LBT operation 350. In some other examples, the UE 115 may perform one or more other operations based on the result 355 of the LBT operation 350, such as by "sharing" access to the at least one wireless communication channel. For example, the UE 115 may transmit a COT sharing message to the base station 105 (or to another device, such as to another UE via a sidelink) that shares the COT with the base station 105.

One or more aspects herein may improve performance of one or more devices of a wireless communication system. For example, by determining the sensing bandwidth 362 based on one or more BWPs, a particular "slice" of a frequency spectrum (such as an unlicensed frequency spectrum) may be selected as the sensing bandwidth 362. As a result, in some cases, the UE 115 may avoid using a sensing bandwidth 362 that is too large (which may increase power consumption) or that is too small (which may result decrease reliability or accuracy of the LBT operation 350).

Further, by determining the sensing bandwidth 362 based on one or more BWPs, the sensing bandwidth 362 may be determined or changed dynamically during operation without introducing one or more additional messages transmitted between the base station 105 and the UE 115. For example, the SIB 410 may also serve as an indication of the sensing bandwidth (e.g., where the sensing bandwidth 362 is based on one or more of the initial UL-BWP 414 or the initial DL-BWP 416). As another example, the one or more RRC configuration messages 420 may serve as an indication of the sensing bandwidth 362 (e.g., where the sensing bandwidth 362 is based on one or more of the active UL-BWP 424 or the active DL-BWP 426). In an illustrative example, the SIB 410 indicates an initial sensing bandwidth 362 (via one or more of the initial UL-BWP 414 or the initial DL-BWP 416) to the UE 115, and the one or more RRC configuration messages 420 indicate an update to the initial sensing bandwidth 362 (by changing the sensing bandwidth 362 from being based on one or more of the initial UL-BWP 414 or the initial DL-BWP 416 to being based on one or more of the active UL-BWP 424 or the active DL-BWP 426). As a result, the sensing bandwidth 362 may be determined or changed dynamically during operation without increasing a number of messages transmitted between the base station 105 and the UE 115.

FIG. 5 is a flow chart illustrating an example of a method 500 of wireless communication performed by a UE according to some aspects of the disclosure. For example, the method 500 may be performed by the UE 115.

The method 500 includes performing, by a UE, a scan in connection with an LBT operation, at 502. A sensing bandwidth associated with the scan is selected by the UE based at least in part on a transmission bandwidth of an uplink transmission, and at least a portion of the sensing bandwidth is included an unlicensed frequency spectrum. For example, the UE 115 may select the sensing bandwidth 362 of the scan 360 based at least in part on a transmission bandwidth of the uplink transmission 330 and may perform the scan 360 in connection with the LBT operation 350. At least a portion of the sensing bandwidth 362 is included an unlicensed frequency spectrum (e.g., an FR2x frequency spectrum).

The method 500 further includes transmitting, by the UE, the uplink transmission based on a result of the scan, at 504. For example, the UE 115 may perform the uplink transmission 334 based on the result 355 of the LBT operation 350.

FIG. 6 is a flow chart illustrating an example of a method 600 of wireless communication performed by a base station according to some aspects of the disclosure. For example, the method 600 may be performed by the base station 105.

The method 600 includes receiving, by a base station, one or more messages from a UE based on a scan in connection with a LBT operation, at 602. A sensing bandwidth associated with the scan is selected by the UE based at least in part on a transmission bandwidth of an uplink transmission, and at least a portion of the sensing bandwidth is included an unlicensed frequency spectrum. For example, the base station 105 may receive one or more of the uplink transmission 330 or the COT sharing message 340 based on the result 355 of the scan 360 in connection with the LBT operation 350. The UE 115 may select the sensing bandwidth 362 (e.g., based on one or more examples described with reference to FIGS. 3A and 3B). At least a portion of the sensing bandwidth 362 may be included in an unlicensed frequency spectrum, such as an FR2x frequency spectrum.

The method 600 further includes transmitting, by the base station, a downlink transmission based on the one or more messages, at 604. For example, the base station 105 may transmit the downlink transmission 342 during the shared COT 392.

Figures 7, 8:
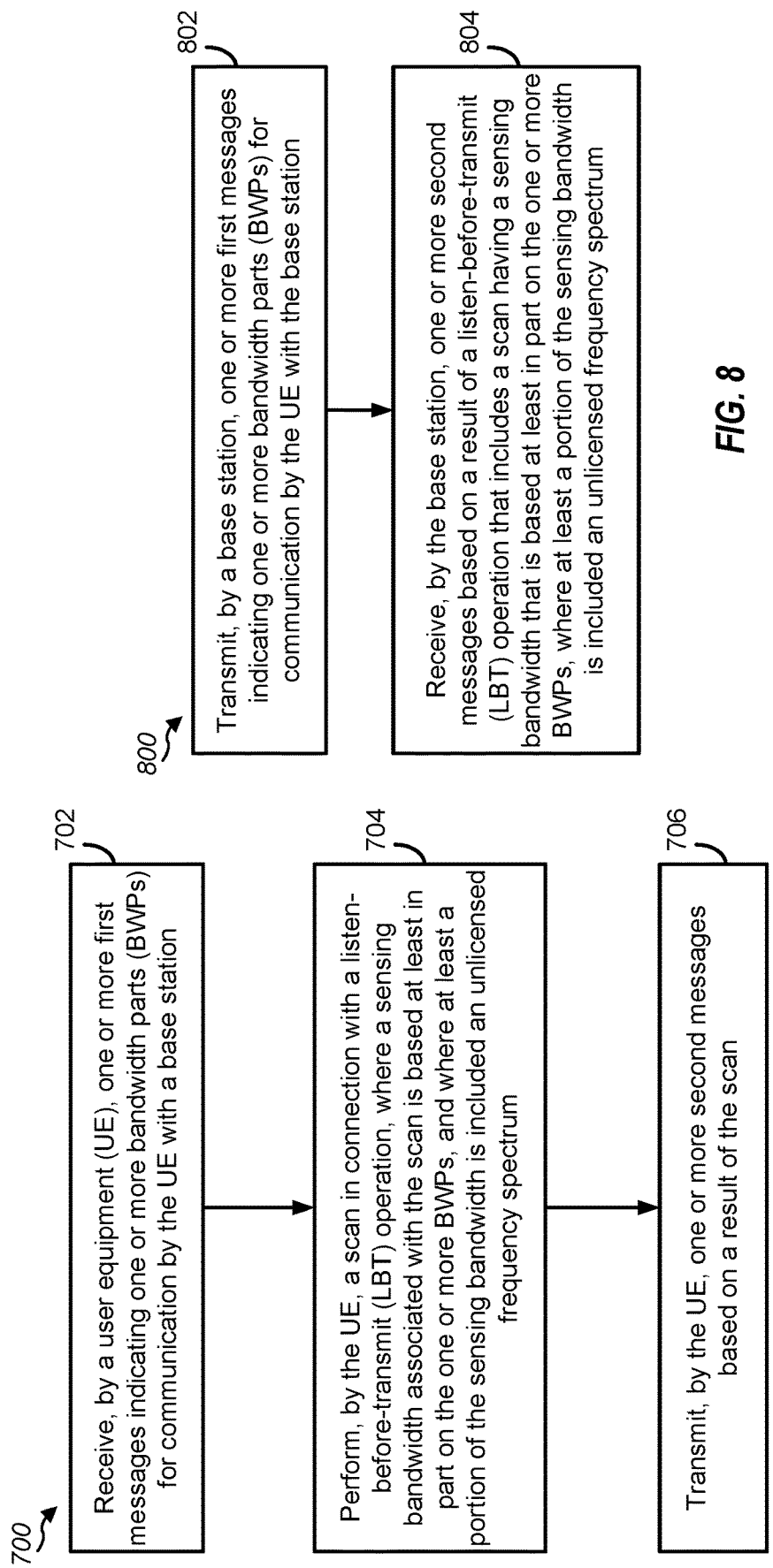
FIG. 7 is a flow chart illustrating another method of wireless communication performed by a UE according to some aspects of the disclosure.
FIG. 8 is a flow chart illustrating another method of wireless communication performed by a base station according to some aspects of the disclosure.

FIG. 7 is a flow chart illustrating an example of a method 700 of wireless communication performed by a UE according to some aspects of the disclosure. For example, the method 700 may be performed by the UE 115.

The method 700 includes receiving, by the UE, one or more first messages indicating one or more BWPs for communication by the UE with a base station, at 702. For example, the UE 115 may receive one or more messages (such as the SIB 410) indicating one or more of the initial UL-BWP 414 or the initial DL-BWP 416. Alternatively or in addition, in some examples, the UE 115 may receive one or more messages (such as the one or more RRC configuration messages 420) indicating one or more of the active UL-BWP 424 or the active DL-BWP 426.

The method 700 further includes performing, by the UE, a scan in connection with an LBT operation, at 704. A sensing bandwidth associated with the scan is based at least in part on the one or more BWPs, and at least a portion of the sensing bandwidth is included an unlicensed frequency spectrum. For example, the UE 115 may perform the scan 360 in connection with the LBT operation 350. The sensing bandwidth 362 associated with the scan 360 may be based at least in part on one or more BWPs (e.g., one or more of the BWPs 414, 416, 424, 426, 430, and 432), and at least a portion of the sensing bandwidth 362 is included an unlicensed frequency spectrum (e.g., an FR2x frequency spectrum). The UE 115 may select the sensing bandwidth 362 of the scan 360 based at least in part on a transmission bandwidth of the uplink transmission 330.

The method 700 further includes transmitting, by the UE, one or more second messages based on a result of the scan, at 706. For example, the UE 115 may perform the uplink transmission 334 based on the result 355 of the LBT operation 350.

FIG. 8 is a flow chart illustrating an example of a method 800 of wireless communication performed by a base station according to some aspects of the disclosure. For example, the method 800 may be performed by the base station 105.

The method 800 includes transmitting, by a base station, one or more first messages indicating one or more bandwidth parts (BWPs) for communication by the UE with the base station, at 802. The one or more BWPs may include one or more of the BWPs 414, 416, 424, 426, 430, and 432. In some examples, the one or more first messages include the SIB 410. Alternatively or in addition, the one or more first messages may include the one or more RRC configuration messages 420.

The method 800 further includes receiving, by the base station, one or more second messages based on a result of an LBT operation that includes a scan having a sensing bandwidth that is based at least in part on the one or more BWPs, where at least a portion of the sensing bandwidth is included an unlicensed frequency spectrum, at 804. For example, the base station 105 may receive the uplink transmission 334 based on a result of the LBT operation 350, which may include the scan 360 having the sensing bandwidth 362 based on one or more of the BWPs 414, 416, 424, 426, 430, and 432.

Figures 9, 10:
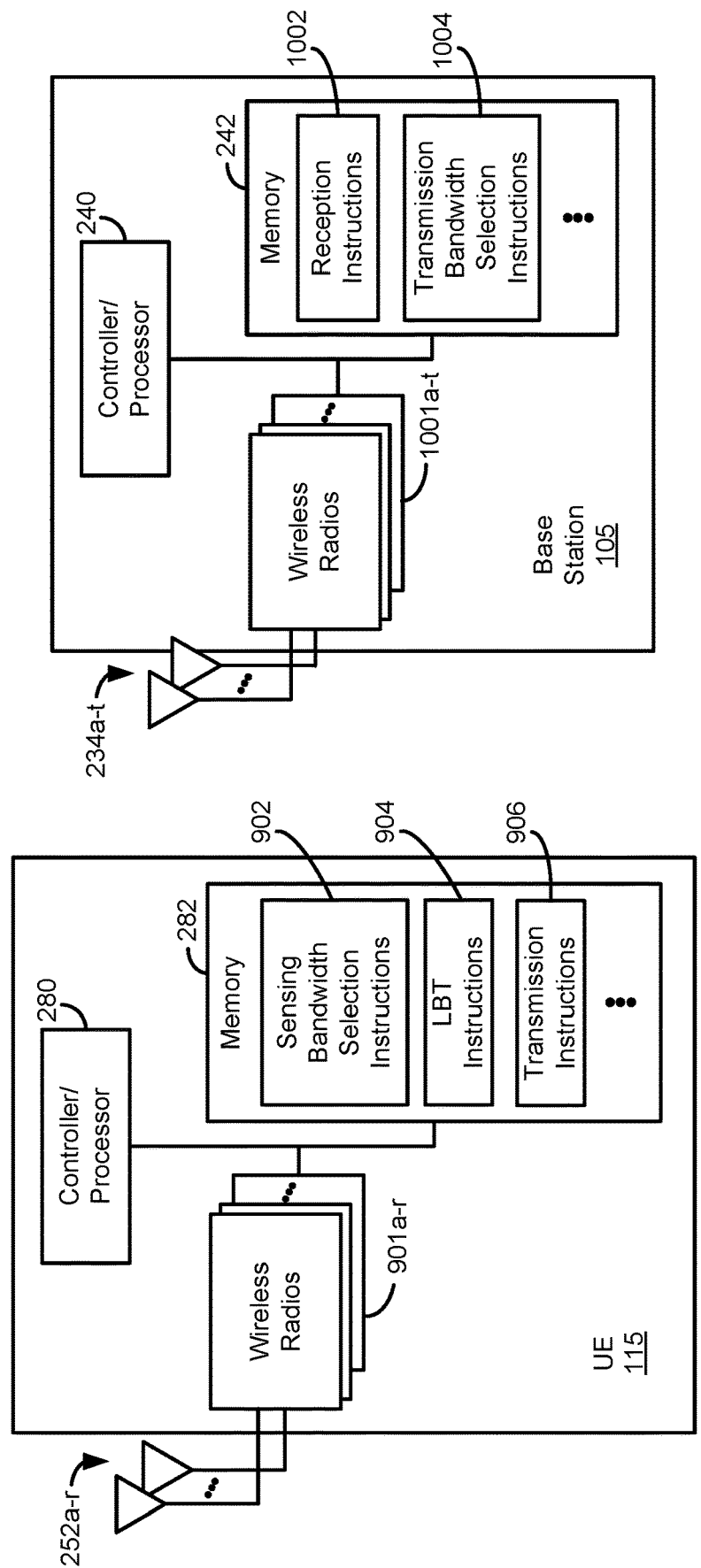
FIG. 9 is a block diagram illustrating an example of a UE according to some aspects of the disclosure.
FIG. 10 is a block diagram illustrating an example of a base station according to some aspects of the disclosure.

FIG. 9 is a block diagram illustrating an example of a UE 115 according to some aspects of the disclosure. The UE 115 may include structure, hardware, or components illustrated in FIG. 2. For example, the UE 115 may include the controller/processor 280, which may execute instructions stored in the memory 282. Using the controller/processor 280, the UE 115 may transmit and receive signals via wireless radios 901*a-r* and antennas 252*a-r*. The wireless radios 901*a-r* may include one or more components or devices described herein, such as the modulator/demodulators 254*a-r*, the MIMO detector 256, the receive processor 258, the transmit processor 264, the TX MIMO processor 266, the transmitter 356, the receiver 358, one or more other components or devices, or a combination thereof.

The memory 282 may store instructions executable by the controller/processor 280 to initiate, perform, or control one or more operations described herein. For example, the memory 282 may store sensing bandwidth selection instructions 902 executable by the controller/processor 280 to select the sensing bandwidth 362 (e.g., based on one or more criteria described herein). As another example, the memory 282 may store LBT instructions 904 executable by the controller/processor 280 to initiate, perform, or control the LBT operation 350. As an additional example, the memory 282 may store transmission instructions 906 executable by the controller/processor 280 to initiate, perform, or control transmission of the uplink transmission 330, the COT sharing message 340, or both.

FIG. 10 is a block diagram illustrating an example of a base station according to some aspects of the disclosure. The base station 105 may include structure, hardware, and components illustrated in FIG. 2. For example, the base station 105 may include the controller/processor 240, which may execute instructions stored in memory 242. Under control of the controller/processor 240, the base station 105 may transmit and receive signals via wireless radios 1001a-t and antennas 234a-t. The wireless radios 1001a-t may include one or more components or devices described herein, such as the modulator/demodulators 232a-t, the MIMO detector 236, the receive processor 238, the transmit processor 220, the TX MIMO processor 230, the transmitter 306, the receiver 308, one or more other components or devices, or a combination thereof.

The memory 242 may store instructions executable by the controller/processor 240 to initiate, perform, or control one or more operations described herein. For example, the memory 242 may store reception instructions 1002 executable by the controller/processor 240 to receive the uplink transmission 330, the COT sharing message 340, or both. As another example, the memory 242 may store COT transmission bandwidth selection instructions 1004 executable by the controller/processor 240 to select the transmission bandwidth 344 of the downlink transmission 342 using one or techniques described herein.

According to some further aspects, in a first aspect, a method of wireless communication includes performing, by a user equipment (UE), a scan in connection with a listen-before-transmit (LBT) operation. A sensing bandwidth associated with the scan is selected by the UE based at least in part on a transmission bandwidth of an uplink transmission, and at least a portion of the sensing bandwidth is included an unlicensed frequency spectrum. The method further includes transmitting, by the UE, the uplink transmission based on a result of the scan.

In a second aspect alternatively or in addition to the first aspect, the UE determines the sensing bandwidth based on one or more sensing bandwidth criteria specified by a wireless communication protocol, and the one or more sensing bandwidth criteria specify that the sensing bandwidth is to include at least the transmission bandwidth of the uplink transmission.

In a third aspect alternatively or in addition to one or more of the first through second aspects, the method includes performing a comparison of an energy value determined using the scan to an EDT and determining the result of the scan based on the comparison.

In a fourth aspect alternatively or in addition to one or more of the first through third aspects, the sensing bandwidth includes multiple bandwidth units, and the method includes determining a size of the multiple bandwidth units by the UE.

In a fifth aspect alternatively or in addition to one or more of the first through fourth aspects, the method includes performing the scan separately for each unit of the multiple bandwidth units to determine a plurality of energy values, summing the plurality of energy values to determine a joint energy value, and comparing the joint energy value to an EDT to determine the result of the scan.

In a sixth aspect alternatively or in addition to one or more of the first through fifth aspects, the method includes performing the scan separately for each unit of the multiple bandwidth units to determine a plurality of energy values and comparing each energy value of the plurality of energy values to an EDT to determine a plurality of unit results included in the result of the scan.

In a seventh aspect alternatively or in addition to one or more of the first through sixth aspects, the multiple bandwidth units are non-contiguous.

In an eighth aspect alternatively or in addition to one or more of the first through seventh aspects, the multiple bandwidth units are non-contiguous.

In a ninth aspect alternatively or in addition to one or more of the first through eighth aspects, the LBT operation is associated with a COT, and the method includes transmitting a COT sharing message transmitted to a second device indicating that the COT is shared with the second device to enable the second device to perform a transmission during the COT.

In a tenth aspect alternatively or in addition to one or more of the first through ninth aspects, the sensing bandwidth is determined by the second device based on sensing bandwidth criteria specified by a wireless communication protocol, based on a radio resource control (RRC) message transmitted by the UE to the second device prior to the COT, based on an uplink medium access control control-element (MAC-CE) message transmitted by the UE to the second device prior to the COT, or based on an uplink control information (UCI) message transmitted by the UE to the second device prior to the COT.

In an eleventh aspect alternatively or in addition to one or more of the first through tenth aspects, the COT sharing message indicates the sensing bandwidth.

In a twelfth aspect alternatively or in addition to one or more of the first through eleventh aspects, the second transmission is associated with a second transmission bandwidth, and the second device selects the second transmission bandwidth as a subset of the transmission bandwidth of the uplink transmission.

In a thirteenth aspect alternatively or in addition to one or more of the first through twelfth aspects, the sensing bandwidth includes bandwidth units that are contiguous, and the sensing bandwidth is indicated using a starting frequency associated with the sensing bandwidth and a frequency range of the sensing bandwidth.

In a fourteenth aspect alternatively or in addition to one or more of the first through thirteenth aspects, the sensing bandwidth includes bandwidth units that are contiguous, and wherein the sensing bandwidth is indicated using a size of the bandwidth units, a starting frequency associated with the sensing bandwidth, and a cardinality of the bandwidth units.

In a fifteenth aspect alternatively or in addition to one or more of the first through fourteenth aspects, the sensing bandwidth includes bandwidth units that are non-contiguous, and the sensing bandwidth is indicated using a starting frequency associated with the sensing bandwidth, a size of the bandwidth units, and a bitmap of the bandwidth units.

In a sixteenth aspect alternatively or in addition to one or more of the first through fifteenth aspects, the sensing bandwidth includes bandwidth units that are non-contiguous, and the sensing bandwidth is indicated using a respective starting frequency associated with each bandwidth unit of the bandwidth units and further using a size of the bandwidth units.

In a seventeenth aspect, a method includes any combination of the first through sixteenth aspects.

In an eighteenth aspect alternatively or in addition to one or more of the first through seventeenth aspects, an apparatus includes a receiver configured to perform, at a UE, a scan in connection with a LBT operation. The UE is configured to select a sensing bandwidth associated with the scan based at least in part on a transmission bandwidth of an uplink transmission, and at least a portion of the sensing bandwidth is included an unlicensed frequency spectrum. The apparatus further includes a transmitter configured to transmit, by the UE, the uplink transmission based on a result of the scan.

In a nineteenth aspect alternatively or in addition to one or more of the first through eighteenth aspects, a non-transitory computer-readable medium stores instructions executable by a processor to initiate, perform, or control operations. The operations include performing, by a UE, a scan in connection with a LBT operation. A sensing bandwidth associated with the scan is selected by the UE based at least in part on a transmission bandwidth of an uplink transmission, and at least a portion of the sensing bandwidth is included an unlicensed frequency spectrum. The operations further include transmitting, by the UE, the uplink transmission based on a result of the scan.

In a twentieth aspect alternatively or in addition to one or more of the first through nineteenth aspects, an apparatus includes means for performing, at a UE, a scan in connection with a LBT operation. The UE is configured to select a sensing bandwidth associated with the scan based at least in part on a transmission bandwidth of an uplink transmission, and at least a portion of the sensing bandwidth is included an unlicensed frequency spectrum. The apparatus further includes means for transmitting, by the UE, the uplink transmission based on a result of the scan.

In a twenty-first aspect, a method of wireless communication includes receiving, by a user equipment (UE), one or more first messages indicating one or more bandwidth parts (BWPs) for communication by the UE with a base station. The method further includes performing, by the UE, a scan in connection with a listen-before-transmit (LBT) operation. A sensing bandwidth associated with the scan is based at least in part on the one or more BWPs, and at least a portion of the sensing bandwidth is included an unlicensed frequency spectrum. The method further includes transmitting, by the UE, one or more second messages based on a result of the scan.

In a twenty-second aspect alternatively or in addition to the twenty-first aspect, the one or more BWPs include one or more of an UL-BWP or a DL-BWP, and the sensing bandwidth is based on one of: a first bandwidth of the UL-BWP; a second bandwidth of the DL-BWP; a union of the first bandwidth and the second bandwidth, where the union excludes a third bandwidth that is between the first bandwidth and the second bandwidth; or a span of the first bandwidth and the second bandwidth, where the span includes the third bandwidth.

In a twenty-third aspect alternatively or in addition to one or more of the twenty-first through twenty-second aspects, the sensing bandwidth corresponds to one of the first bandwidth, the second bandwidth, the union of the first bandwidth and the second bandwidth, or the span of the first bandwidth and the second bandwidth.

In a twenty-fourth aspect alternatively or in addition to one or more of the twenty-first through twenty-third aspects, the sensing bandwidth includes and is a superset of one of the first bandwidth, the second bandwidth, the union of the first bandwidth and the second bandwidth, or the span of the first bandwidth and the second bandwidth.

In a twenty-fifth aspect alternatively or in addition to one or more of the twenty-first through twenty-fourth aspects, the method includes performing a bandwidth part (BWP) switching operation to modify one or more of the UL-BWP the DL-BWP, and the sensing bandwidth is determined based on the UL-BWP and the DL-BWP that are active at the UE at a time of transmitting the one or more messages.

In a twenty-sixth aspect alternatively or in addition to one or more of the twenty-first through twenty-fifth aspects, the one or more first messages include one or more radio resource control (RRC) configuration messages from the base station indicating the UL-BWP and the DL-BWP, and the scan is performed by the UE while operating based on an RRC connected mode with the base station.

In a twenty-seventh aspect alternatively or in addition to one or more of the twenty-first through twenty-sixth aspects, the one or more first messages include a system information block (SIB) from the base station while operating based on a radio resource control (RRC) idle mode, and the SIB indicates the UL-BWP and the DL-BWP, and the method includes, after receiving the SIB, performing a random access channel (RACH) procedure with the base station that includes the scan.

In a twenty-eighth aspect alternatively or in addition to one or more of the twenty-first through twenty-seventh aspects, the method includes, after transmitting a particular message associated with RACH procedure, receiving one or more radio resource control (RRC) configuration messages from the base station indicating an active UL-BWP and an active DL-BWP and further includes adjusting the sensing bandwidth from being based on the UL-BWP and the DL-BWP indicated by the SIB to being based on the active UL-BWP and the active DL-BWP indicated by the one or more RRC configuration messages.

In a twenty-ninth aspect alternatively or in addition to one or more of the twenty-first through twenty-eighth aspects, the RACH procedure corresponds to a four-step contention-based RACH procedure, and the particular message corresponds to a message of type three (Msg3) associated with the four-step contention-based RACH procedure.

In a thirtieth aspect alternatively or in addition to one or more of the twenty-first through twenty-ninth aspects, the RACH procedure corresponds to a two-step RACH procedure, and the particular message corresponds to a message of type A (MsgA) associated with the two-step RACH procedure.

In a thirty-first aspect alternatively or in addition to one or more of the twenty-first through thirtieth aspects, the method includes receiving a configuration of one or more supplemental uplink (SUL) carriers.

In a thirty-second aspect alternatively or in addition to one or more of the twenty-first through thirty-first aspects, the scan is performed separately for each SUL carrier of the one or more SUL carriers, and a separate sensing bandwidth for each SUL carrier corresponds to an active UL-BWP associated with the SUL carrier and included in the one or more BWPs.

In a thirty-third aspect alternatively or in addition to one or more of the twenty-first through thirty-second aspects, the scan is performed jointly for a primary carrier and the one or more SUL carriers, and the sensing bandwidth includes bandwidths of active uplink BWPs (UL-BWP) associated with the primary carrier and the one or more SUL carriers and included in the one or more BWPs.

In a thirty-fourth aspect alternatively or in addition to one or more of the twenty-first through thirty-third aspects, the method includes receiving a configuration of multiple carrier frequencies.

In a thirty-fifth aspect alternatively or in addition to one or more of the twenty-first through thirty-fourth aspects, the scan is performed separately for each carrier frequency of the multiple carrier frequencies, and a separate sensing bandwidth for each carrier frequency corresponds to an active UL-BWP associated with the carrier frequency and included in the one or more BWPs.

In a thirty-sixth aspect alternatively or in addition to one or more of the twenty-first through thirty-fifth aspects, the scan is performed jointly for the multiple carrier frequencies, and the sensing bandwidth includes bandwidths of active uplink BWPs (UL-BWP) associated with the multiple carrier frequencies and included in the one or more BWPs.

In a thirty-seventh aspect, a method includes any combination of the twenty-first through thirty-sixth aspects.

In a thirty-eighth aspect alternatively or in addition to one or more of the twenty-first through thirty-seventh aspects, an apparatus includes a receiver configured to receive, at a UE, one or more first messages indicating one or more BWPs for communication by the UE with a base station and to perform a scan in connection with a LBT operation. A sensing bandwidth associated with the scan is based at least in part on the one or more BWPs, and at least a portion of the sensing bandwidth is included an unlicensed frequency spectrum. The apparatus further includes a transmitter configured to transmit one or more second messages based on a result of the scan.

In a thirty-ninth aspect alternatively or in addition to one or more of the twenty-first through thirty-eighth aspects, a non-transitory computer-readable medium stores instructions executable by a processor to initiate, perform, or control operations. The operations include receiving, by a UE, one or more first messages indicating one or more BWPs for communication by the UE with a base station. The operations further include performing, by the UE, a scan in connection with a LBT operation. A sensing bandwidth associated with the scan is based at least in part on the one or more BWPs, and at least a portion of the sensing bandwidth is included an unlicensed frequency spectrum. The operations further include transmitting, by the UE, one or more second messages based on a result of the scan.

In a fortieth aspect alternatively or in addition to one or more of the twenty-first through thirty-ninth aspects, an apparatus includes means for receiving, at a UE, one or more first messages indicating one or more BWPs for communication by the UE with a base station and for performing a scan in connection with a LBT operation. A sensing bandwidth associated with the scan is based at least in part on the one or more BWPs, and at least a portion of the sensing bandwidth is included an unlicensed frequency spectrum. The apparatus further includes means for transmitting one or more second messages based on a result of the scan.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

One or more functional blocks and modules described herein may comprise processors, electronics devices, hardware devices, electronics components, logical circuits, memories, software codes, firmware codes, etc., or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. A method of wireless communication, comprising:
    performing, by a user equipment (UE), a scan in connection with a listen-before-transmit (LBT) operation, wherein a sensing bandwidth associated with the scan is in accordance with a first transmission bandwidth of a first uplink transmission, and wherein at least a portion of the sensing bandwidth is included in an unlicensed frequency spectrum; and
    transmitting, by the UE, the first uplink transmission in accordance with a result of the scan, wherein a channel occupancy time (COT) is associated with the first uplink transmission and with a second uplink transmission, and wherein a second transmission bandwidth of the second uplink transmission corresponds to a subset of the first transmission bandwidth.

2. The method of claim 1, wherein the sensing bandwidth is in accordance with one or more sensing bandwidth criteria specified by a wireless communication protocol, and wherein the one or more sensing bandwidth criteria specify that the sensing bandwidth is to include at least the first transmission bandwidth of the first uplink transmission.

3. The method of claim 2, further including:
    performing a comparison of an energy value determined using the scan to an energy detection threshold (EDT); and
    determining the result of the scan based on the comparison.

4. The method of claim 1, wherein the sensing bandwidth includes multiple bandwidth units, and further including determining a size of the multiple bandwidth units by the UE.

5. The method of claim 4, further including:
    performing the scan separately for each unit of the multiple bandwidth units to determine a plurality of energy values;
    summing the plurality of energy values to determine a joint energy value; and
    comparing the joint energy value to an energy detection threshold (EDT) to determine the result of the scan.

6. The method of claim 4, further including:
    performing the scan separately for each unit of the multiple bandwidth units to determine a plurality of energy values; and
    comparing each energy value of the plurality of energy values to an energy detection threshold (EDT) to determine a plurality of unit results included in the result of the scan.

7. The method of claim 4, wherein the multiple bandwidth units are non-contiguous.

8. The method of claim 4, wherein the multiple bandwidth units are non-contiguous.

9. The method of claim 1, further including transmitting a COT sharing message to a second device indicating that the COT is shared with the second device to enable the second device to perform the second uplink transmission during the COT.

10. The method of claim 9, wherein the sensing bandwidth is determined by the second device in accordance with sensing bandwidth criteria specified by a wireless communication protocol, in accordance with a radio resource control (RRC) message transmitted by the UE to the second device prior to the COT, in accordance with an uplink medium access control control-element (MAC-CE) message transmitted by the UE to the second device prior to the COT, or in accordance with an uplink control information (UCI) message transmitted by the UE to the second device prior to the COT.

11. The method of claim 9, wherein the COT sharing message indicates the sensing bandwidth.

12. The method of claim 9, wherein the second device selects the second transmission bandwidth as the subset of the first transmission bandwidth of the first uplink transmission.

13. An apparatus, comprising:
    a receiver configured to perform, at a user equipment (UE), a scan in connection with a listen-before-transmit (LBT) operation, wherein a sensing bandwidth associated with the scan is in accordance with a first transmission bandwidth of a first uplink transmission, and wherein at least a portion of the sensing bandwidth is included in an unlicensed frequency spectrum; and
    a transmitter configured to transmit, by the UE, the first uplink transmission in accordance with a result of the scan, wherein a channel occupancy time (COT) is associated with the first uplink transmission and with a second uplink transmission, and wherein a second transmission bandwidth of the second uplink transmission corresponds to a subset of the first transmission bandwidth.

14. The apparatus of claim 13, wherein the sensing bandwidth includes multiple bandwidth units, and wherein the UE is configured to determine a size of the multiple bandwidth units.

15. The apparatus of claim 14, wherein the UE is further configured to:
    perform the scan separately for each unit of the multiple bandwidth units to determine a plurality of energy values;
    sum the plurality of energy values to determine a joint energy value; and
    compare the joint energy value to an energy detection threshold (EDT) to determine the result of the scan.

16. The apparatus of claim 14, wherein the UE is further configured to:
    perform the scan separately for each unit of the multiple bandwidth units to determine a plurality of energy values; and compare each energy value of the plurality of energy values to an energy detection threshold (EDT) to determine a plurality of unit results included in the result of the scan.

17. The apparatus of claim 14, wherein the multiple bandwidth units are non-contiguous.

18. The apparatus of claim 13, wherein the transmitter is further configured to transmit a COT sharing message to a second device indicating that the COT is shared with the second device to enable the second device to perform the second uplink transmission during the COT.

19. The apparatus of claim 18, wherein the sensing bandwidth is determined by the second device in accordance with sensing bandwidth criteria specified by a wireless communication protocol, in accordance with a radio resource control (RRC) message transmitted by the UE to the second device prior to the COT, in accordance with an uplink medium access control control-element (MAC-CE) message transmitted by the UE to the second device prior to the COT, or in accordance with an uplink control information (UCI) message transmitted by the UE to the second device prior to the COT.

20. The apparatus of claim 18, wherein the COT sharing message indicates the sensing bandwidth.

21. The apparatus of claim 18, wherein the second device selects the second transmission bandwidth as the subset of the first transmission bandwidth of the first uplink transmission.

22. The apparatus of claim 18, wherein the sensing bandwidth includes bandwidth units that are contiguous, and wherein the sensing bandwidth is indicated using a starting frequency associated with the sensing bandwidth and a frequency range of the sensing bandwidth.

23. The apparatus of claim 18, wherein the sensing bandwidth includes bandwidth units that are contiguous, and wherein the sensing bandwidth is indicated using a size of the bandwidth units, a starting frequency associated with the sensing bandwidth, and a cardinality of the bandwidth units.

24. The apparatus of claim 18, wherein the sensing bandwidth includes bandwidth units that are non-contiguous, and wherein the sensing bandwidth is indicated using a starting frequency associated with the sensing bandwidth, a size of the bandwidth units, and a bitmap of the bandwidth units.

25. The apparatus of claim 18, wherein the sensing bandwidth includes bandwidth units that are non-contiguous, and wherein the sensing bandwidth is indicated using a respective starting frequency associated with each bandwidth unit of the bandwidth units and further using a size of the bandwidth units.

26. An apparatus, comprising:
  means for performing, at a user equipment (UE), a scan in connection with a listen-before-transmit (LBT) operation, wherein a sensing bandwidth associated with the scan is in accordance with a first transmission bandwidth of a first uplink transmission, and wherein at least a portion of the sensing bandwidth is included in an unlicensed frequency spectrum; and
  transmitting, by the UE, the first uplink transmission in accordance with a result of the scan, wherein a channel occupancy time (COT) is associated with the first uplink transmission and with a second uplink transmission, and wherein a second transmission bandwidth of the second uplink transmission corresponds to a subset of the first transmission bandwidth.

27. The apparatus of claim 26, wherein the sensing bandwidth is in accordance with one or more sensing bandwidth criteria specified by a wireless communication protocol associated with the UE or with a message transmitted by the UE prior to the COT.

28. The apparatus of claim 27, wherein the message corresponds to a radio resource control (RRC) message transmitted by the UE prior to the COT.

29. The apparatus of claim 27, wherein the message corresponds to an uplink medium access control control-element (MAC-CE) message transmitted by the UE prior to the COT.

30. The apparatus of claim 27, wherein the message corresponds to an uplink control information (UCI) message transmitted by the UE prior to the COT.

* * * * *